(12) United States Patent
Nakagawa et al.

(10) Patent No.: US 8,781,029 B2
(45) Date of Patent: Jul. 15, 2014

(54) FREQUENCY OFFSET ESTIMATION APPARATUS, RECEPTION APPARATUS, FREQUENCY OFFSET ESTIMATION METHOD, AND RECEPTION METHOD

(75) Inventors: Tadao Nakagawa, Yokosuka (JP); Munehiro Matsui, Yokosuka (JP); Koichi Ishihara, Yokosuka (JP); Riichi Kudo, Yokosuka (JP); Takayuki Kobayashi, Yokosuka (JP); Etsushi Yamazaki, Yokosuka (JP); Akihide Sano, Yokosuka (JP); Eiji Yoshida, Yokosuka (JP); Masato Mizoguchi, Yokosuka (JP); Yutaka Miyamoto, Yokosuka (JP); Yasushi Takatori, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/701,963

(22) PCT Filed: Jun. 17, 2011

(86) PCT No.: PCT/JP2011/063903
§ 371 (c)(1),
(2), (4) Date: Dec. 4, 2012

(87) PCT Pub. No.: WO2011/158932
PCT Pub. Date: Dec. 22, 2011

(65) Prior Publication Data
US 2013/0070874 A1 Mar. 21, 2013

(30) Foreign Application Priority Data

Jun. 17, 2010 (JP) ................................. 2010-138402
Nov. 10, 2010 (JP) ................................. 2010-251868

(51) Int. Cl.
*H03K 9/10* (2006.01)
*H04L 17/14* (2006.01)

(52) U.S. Cl.
USPC ........................................... 375/323; 375/334

(58) Field of Classification Search
CPC . H04L 1/206; H04L 27/008; H04L 2027/002; H04B 10/6164; H04B 7/10
USPC .................. 375/323, 334, 341, 346; 342/139, 342/357.68
See application file for complete search history.

(56) References Cited

U.S. PATENT DOCUMENTS

2012/0070159 A1* 3/2012 Ishihara et al. ............... 398/202

FOREIGN PATENT DOCUMENTS

| CN | 101076004 A | 11/2007 |
|---|---|---|
| EP | 2 187 531 A1 | 5/2010 |
| JP | 06-509691 A | 10/1994 |
| JP | 2005-524327 A | 8/2005 |
| JP | 2009-530918 A | 8/2009 |
| JP | 2010-516076 A | 5/2010 |

OTHER PUBLICATIONS

M. K. Nezami et al., "DFT-based frequency acquisition algorithm for large carrier offsets in mobile satellite receivers", Electronics Letter, vol. 37, pp. 386-387, Mar. 2001.
A. Leven et al., "Frequency estimation in intradyne reception", IEEE Photonics Technology Letters, vol. 19, pp. 366-368, Mar. 2007.
K. Piyawanno et al., "Fast and accurate automatic frequency control for coherent receivers", ECOC2009, paper 7.3.1, Sep. 2009.
P. Ciblat et al., "Blind NLLS carrier frequency-offset estimation for QAM, PSK, and PAM modulations: performance at low SNR", IEEE Transactions on Communications, vol. 54, pp. 1725-1730, Oct. 2006.
M. Selmi et al., "Accurate digital frequency offset estimator for coherent PolMux QAM transmission systems", ECOC2009, paper P3.08, Sep. 2009.
International Search Report for PCT/JP2011/063903, ISA/JP, mailed Aug. 2, 2011, with English translation.
Search Report, European Patent Application No. 11795834.8, Oct. 25, 2013.
Office Action, Chinese Patent Application No. 201180028973.0, Feb. 21, 2014.

* cited by examiner

*Primary Examiner* — Khai Tran

(74) *Attorney, Agent, or Firm* — Harness, Dickey & Pierce, P.L.C.

(57) ABSTRACT

Provided is a frequency offset estimation apparatus that appropriately estimates and compensates for a frequency offset of a received signal when estimating the frequency offset which is the difference between a carrier frequency of the received signal and the frequency of an output signal of a local oscillator. The frequency offset estimation apparatus converts the received signal sampled in advance with a predetermined sampling frequency into a frequency spectrum having N frequency components, limits a frequency band of negative frequency components from 1 to N/2 of the frequency spectrum and a frequency band of positive frequency components from N/2+1 to N of the frequency spectrum, calculates the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifts all frequency components of the frequency spectrum in a frequency domain until the absolute value of a power difference between the power of the positive frequency components and the power of the negative frequency components is less than or equal to a predetermined threshold value, and estimates the frequency offset based on a shift amount until the absolute value is less than or equal to the threshold value.

22 Claims, 24 Drawing Sheets

FREQUENCY OFFSET ESTIMATION APPARATUS, RECEPTION APPARATUS, FREQUENCY OFFSET ESTIMATION METHOD, AND RECEPTION METHOD

TECHNICAL FIELD

The present invention relates to a frequency offset estimation apparatus, a reception apparatus, a frequency offset estimation method, and a reception method in a digital coherent optical receiver and a wireless communications receiver.

This application is a 371 U.S. National Stage of International Application No. PCT/JP2011/063903, filed Jun. 17, 2011. Priority is claimed on Japanese Patent Applications No. 2010-138402, filed Jun. 17, 2010 and No. 2010-251868, filed Nov. 10, 2010, the contents of which are incorporated herein by reference.

BACKGROUND ART

In an optical communications field, digital coherent communications systems in which a coherent detection scheme of dramatically improving frequency utilization efficiency is combined with digital signal processing are attracting attention. Compared to systems constructed based on direct detection, digital coherent communications systems are known to be capable of not only improving receiving sensitivity but also compensating for waveform distortion of a transmission signal caused by chromatic dispersion and/or polarization mode dispersion resulting from optical fiber transmission by receiving the transmission signal as a digital signal, and introduction of the digital coherent communications systems as a next generation optical communications technique is being discussed.

Signal light received in a coherent receiver is multiplied by local oscillator light and converted into a baseband signal. In a laser oscillator that generates a carrier of signal light or local oscillator light, it is difficult to implement frequency stabilization by a phase-locked loop which is generally used in an oscillator for wireless communications, and a large frequency offset occurs between an output frequency of a laser oscillator of a transmitter and an output frequency of a laser oscillator of a receiver occurs. In an optical communications system, a frequency offset reaches ±5 GHz. In a coherent communications system, since information is carried on the phase of a carrier, it is necessary for a receiver to estimate and compensate for a frequency offset.

Furthermore, in wireless communications, a frequency offset occurs due to errors of oscillation frequencies of reference oscillators used in a transmitter and a receiver and the Doppler shift associated with movement of a transmitter and a receiver. Even in this case, it is necessary for the receiver to estimate and compensate for a frequency offset.

As conventional estimation of a frequency offset, there is a method using a known pilot symbol (refer to Non-Patent Document 1). However, this method has a problem in that a transmission speed is reduced because a known pilot symbol not contributing to information transmission is added to a transmission signal, and a circuit and a procedure for detecting the known pilot symbol is required.

On the other hand, as a frequency offset estimation method requiring no known pilot symbol, a method using a phase increment algorithm utilizing phase change information of a symbol in one symbol period (refer to Non-Patent Document 2) and a method utilizing a frequency spectrum (refer to Non-Patent Document 3) have been known.

FIG. 17 is a block diagram illustrating a configuration example of a conventional frequency offset estimation apparatus using a phase increment algorithm for an M-ary phase shift keying (M-PSK) modulation signal. The frequency offset estimation apparatus illustrated in FIG. 17 includes a 1-symbol delay unit 101, a complex conjugate unit 102, a multiplication unit 103, an $M^{th}$ power unit 104, an addition unit 105, and a phase detection unit 106.

An input signal I+jQ is a complex signal obtained by sampling in advance a received signal with a predetermined sampling frequency. The input signal is split into two, wherein one split signal passes through the 1-symbol delay unit 101 and the complex conjugate unit 102, is multiplied by the other split signal in the multiplication unit 103, and becomes a complex signal with phase change information of one symbol. This complex signal is raised to an $M^{th}$ (a positive integer) power in the $M^{th}$ power unit 104, so that a phase change caused by data modulation is eliminated. Signals from which the phase change has been eliminated are added over N (a positive integer) symbols in the addition unit 105, so that averaging related to a phase is performed, resulting in the elimination of an instantaneous change. A phase is extracted from the signal after the addition in the phase detection unit 106, and a phase corresponding to M times the phase change in one symbol caused by the $M^{th}$ power operation of the $M^{th}$ power unit 104 is multiplied by 1/M. As a consequence, the phase change $\Delta\theta$ of one symbol caused by a frequency offset is obtained. An estimated frequency offset $\Delta f$ is calculated by the following formula. Note that in this formula, $R_S$ denotes a symbol rate.

[Expression 1]

$$\Delta f = \frac{\Delta\theta}{2\pi} R_S \qquad \text{(formula 1)}$$

FIG. 18 is a block diagram illustrating a configuration example of a conventional frequency offset estimation apparatus using a frequency spectrum. The frequency offset estimation apparatus illustrated in FIG. 18 includes a multiplication unit 107, a fast Fourier transform (FFT) unit 108, a frequency error detection unit 109, and a numerically-controlled oscillator (NCO) unit 110.

An input signal I+jQ is a complex signal obtained by sampling in advance a received signal with a predetermined sampling frequency. The input signal is multiplied by an output signal of the NCO 110 in the multiplication unit 107, so that the frequency of the input signal is changed. The signal with the changed frequency is input to the FFT unit 108 and is converted into a frequency spectrum in a frequency domain. The frequency error detection unit 109 measures the frequency spectrum and outputs a frequency error signal. Based on this frequency error signal, the NCO unit 110 changes the frequency of its output signal in predetermined steps. The above loop operation is repeated until the frequency error signal is nearly 0, and the frequency offset estimation is completed when the frequency error signal is nearly 0 and converges.

The phase increment algorithm illustrated in FIG. 17 accurately operates only for an M-PSK modulation signal, in which constellation points are arranged at an equal phase interval on a constellation, and does not operate for a signal modulated with quadrature amplitude modulation (QAM). Frequency offset estimation methods requiring no known pilot symbol for the signal modulated with QAM are disclosed in Non-Patent Document 4 and Non-Patent Document 5. Formulas representing the estimation methods disclosed in these documents are as follows.

[Expression 2]

$$\hat{f} = \frac{1}{4} \underset{f}{\operatorname{argmax}} \sum_{p=1}^{2} \left| \frac{1}{N} \sum_{t=0}^{N-1} y^4(p,t) e^{-j2\pi ft} \right|^2 \quad \text{(formula 2)}$$

where $\hat{f}$: estimated frequency offset arg max $_f$ g(x): operator for obtaining x that gives maximum value of function g(x)

Here, y(p, t) is a received signal and is a function of polarization p and a time t. Furthermore, N denotes the number of symbols used in estimation, and $R_S$ denotes a symbol rate.

[Expression 3]

$$-\frac{R_S}{2} \leq f \leq \frac{R_S}{2} \quad \text{(formula 3)}$$

Here, an estimation range of a frequency offset of Formula 2 is limited by Formula 3.

Next, the operation of the estimation method will be described with reference to FIG. 19 to FIG. 22.

FIG. 19 to FIG. 22 are explanatory diagrams illustrating the operation of the frequency offset estimation method according to Non-Patent Document 4 and Non-Patent Document 5.

FIG. 19 illustrates a constellation when a signal modulated with 64 QAM has a frequency offset of 0 or an integer multiple of $R_S/4$ and a phase offset remains. The period of constellation points is a reciprocal of a symbol rate, $1/R_S$, and when a frequency offset is $R_S/4$, constellation points on the constellation exist in positions rotated by exactly $\pi/2$ from positions when the frequency offset is 0. That is, the arrangement of the constellation when the frequency offset is 0 is the same as that when the frequency offset is an integer multiple of $R_S/4$. Since a signal modulated with QAM has phase symmetry of $\pi/2$, when the phase of a constellation point is a phase $\theta$, there are three points which have the distance from the origin that is equal to the distance between this constellation point and the origin and which have a phase difference of an integer multiple of $\pi/2$ with respect to this constellation point. In FIG. 19, these points are indicated by black circles k1 to k4. The phases $\beta$ of the four black circles k1, k2, k3, and k4 are expressed by the following Formula 4.

[Expression 4]

$$\beta = \theta + \frac{\pi}{2} n (n = 0, 1, 2, 3) \quad \text{(formula 4)}$$

The phases when these signals have been raised to the fourth power are $4\beta$ and are expressed by the following Formula 5.

[Expression 5]

$$\begin{aligned} 4\beta &= 4\theta + 2\pi n \\ &= 4\theta \end{aligned} \quad \text{(formula 5)}$$

That is, when the four black circles k1, k2, k3, and k4 are raised to the fourth power, they converge on the same point on a complex plane. In the same manner, when the other points are raised to the fourth power, every four points having the same distance from the origin and having a phase difference of an integer multiple of $\pi/2$ converge on the same point on a complex plane.

FIG. 20 is a constellation diagram when the constellation points of the constellation of FIG. 19 have been raised to the fourth power. 64 points of FIG. 19 converge on 16 points in FIG. 20. These constellation points are asymmetrical to one another about a real axis (a horizontal axis) and an imaginary axis (a vertical axis) and the sum or the average of the constellation points is a value that is not 0.

FIG. 21 illustrates a constellation when a signal modulated with 64 QAM has a frequency offset that is not an integer multiple of $R_S/4$. Constellation points having the same distance from the origin are arranged on the circumference. FIG. 22 is a constellation diagram when the constellation points of the constellation of FIG. 21 have been raised to the fourth power. Since these constellation points are symmetrical to one another about a real axis (a horizontal axis) and an imaginary axis (a vertical axis), the sum or the average of the constellation points is 0.

Formula 2 above includes the following term.

$$\sum_{p=1}^{2} \left| \frac{1}{N} \sum_{t=0}^{N-1} y^4(p,t) e^{-j2\pi ft} \right|^2 \quad \text{[Expression 6]}$$

When this term is set as an evaluation function $\phi_c(f)$, this is an operation for raising a received signal y(p, t) to the fourth power, operating an inverse rotation operator $\exp(-j2\pi ft)$ of a frequency f, and obtaining a time average. The operation of the inverse rotation operator $\exp(-j2\pi ft)$ is to frequency-convert the frequency of the original signal by $-f$. Accordingly, when a frequency offset of the received signal y(p, t) is fo and the frequency f of the evaluation function $\phi_c(f)$ is not equal to $4fo+kR_S$ (k is an integer), the evaluation function $\phi_c(f)$ is 0. Furthermore, when the frequency f is equal to $4fo+kR_S$ (k is an integer), the evaluation function $\phi_c(f)$ has a value that is not 0.

Moreover, since the ambiguity of $kR_S$ (k is an integer) is eliminated by the limitation of the frequency offset estimation range of Formula 3, f which allows the evaluation function $\phi_c(f)$ to have a maximum value is calculated and is multiplied by ¼, so that it is possible to estimate the frequency offset fo.

PRIOR ART DOCUMENTS

Non-Patent Documents

Non-Patent Document 1: M. K. Nezami et al., "DFT-based frequency acquisition algorithm for large carrier offsets in mobile satellite receivers", Electronics Letters, volume 37, pp. 386-387, March 2001.

Non-Patent Document 2: A. Leven et al., "Frequency estimation in intradyne reception", IEEE Photonics Technology Letters, volume 19, pp. 366-368, March 2007.

Non-Patent Document 3: K. Piyawanno et al., "Fast and accurate automatic frequency control for coherent receivers", ECOC2009, paper 7.3.1, September, 2009.

Non-Patent Document 4: P. Ciblat et al., "Blind NLLS carrier frequency-offset estimation for QAM, PSK, and PAM modulations: performance at low SNR", IEEE Transactions on Communications, volume 54, pp. 1725-1730, October 2006.

Non-Patent Document 5: M. Selmi et al., "Accurate digital frequency offset estimator for coherent PolMux QAM transmission systems", ECOC2009, paper P3.08, September, 2009.

SUMMARY OF INVENTION

Problems to be Solved by the Invention

However, in the conventional frequency offset estimation apparatus using the phase increment algorithm illustrated in FIG. 17, the range of an estimable frequency offset is limited by the ambiguity of the phase. In the phase detection unit 106, the range of a phase which can be extracted by a phase extraction operation "arg(·)" is [−π to π]. Since the extracted phase is further multiplied by 1/M, the range of the phase which can be detected by the phase detection unit 106 is [−π/M to π/M]. Accordingly, there is a problem in that a frequency range which can be estimated by the frequency offset estimation apparatus illustrated in FIG. 17 is limited to [−$R_S$/2M to $R_S$/2M] by Formula 1.

Furthermore, in the conventional frequency offset estimation apparatus using the frequency spectrum illustrated in FIG. 18, since the frequency offset estimation apparatus needs to acquire an input signal with the number of samples that is equal to the size of the FFT, i.e., several hundreds to several thousands, when FFT is performed for each frequency while the frequency of the output signal of the NCO 110 is being changed in predetermined steps, there is a problem in that much time is required until the estimation process converges. Moreover, in the frequency offset estimation apparatus using the frequency spectrum, when the cutoff frequency of a band-pass filter on a transmission path or a low pass filter in a receiver is small and the frequency offset is large, one side of the frequency spectrum is cut and the frequency spectrum becomes asymmetric, and thus there is a problem in that the estimation accuracy of the frequency offset is degraded.

Furthermore, in the conventional frequency offset estimation method for the signal modulated with QAM (Non-Patent Document 4 and Non-Patent Document 5), which are represented by Formula 2 and Formula 3, there is a problem in that an estimable frequency range is limited to [−$R_S$/2 to $R_S$/2] in the frequency band raised to the fourth power, and it is limited to [−$R_S$/8 to $R_S$/8] in the original frequency band before being raised to the fourth power. That is, there is a problem in that a frequency offset exceeding this range is erroneously detected. Moreover, there is a problem in that when there is phase noise, constellation points on a constellation move along the circumference, which results in the same state as in FIG. 21 when a frequency offset exists, and thus correct estimation is not possible. These problems will be specifically described with reference to FIG. 23 to FIG. 25. FIG. 23 to FIG. 25 are explanatory diagrams illustrating an example of simulation results for explaining the conventional problems.

It is to be noted that, in the simulation results, modulation is dual polarization-64 quadrature amplitude modulation (DP-64QAM) with a symbol rate of 28 GBaud, an optical signal-to-noise ratio (OSNR) is 10 dB, the number N of symbols used in estimation is 1028, a frequency offset is set as 5 GHz, and a frequency f and an evaluation function $\phi_c(f)$ expressed by the following Formula 6 are plotted.

[Expression 7]

$$\varphi_c(f) = \sum_{p=1}^{2} \left| \frac{1}{N} \sum_{t=0}^{N-1} y^4(p, t) e^{-j2\pi ft} \right|^2 \quad \text{(formula 6)}$$

FIG. 23 illustrates simulation results when the frequency f has been swept to a wideband from −64 GHz to 64 GHz. It is to be noted that, in the present simulation, no phase noise is added. FIG. 23 illustrates ambiguity in which the evaluation function becomes large from 20 GHz, which is four times the frequency offset, every frequency interval of $R_S$ (=28 GHz). Accordingly, it can be understood that, in the frequency offset estimation methods disclosed in Non-Patent Document 4 and Non-Patent Document 5, there is a problem in that a frequency range that does not include two or more peaks of the evaluation function at all times is limited to [−$R_S$/2 to $R_S$/2].

Furthermore, FIG. 24 and FIG. 25 illustrate simulation results when the linewidth of a laser is assumed to be 10 MHz. It is to be noted that, in the present simulation, phase noise is added. In FIG. 24 and FIG. 25, 1028 symbol sequences used in estimation are different from one another. In FIG. 24, the largest value is obtained at 20 GHz, which is four times the frequency offset, but many local peaks are observed at other frequencies. In FIG. 25, a peak exists at 20 GHz, but a local peak different from 20 GHz has the largest value among all the peaks. That is, when f which allows the evaluation function $\phi_c(f)$ to have a maximum value is calculated from FIG. 25, an erroneous value is estimated as a frequency offset. In this way, in the frequency offset estimation method disclosed in Non-Patent Document 4 and Non-Patent Document 5, there is a problem in that an erroneous estimation result is frequently output depending on the state of phase noise and/or thermal noise.

The present invention has been made in view of such circumstances, and an object thereof is to provide a frequency offset estimation apparatus, a reception apparatus, a frequency offset estimation method, and a reception method, by which it is possible to appropriately estimate a frequency offset of a received signal when estimating the frequency offset that is the difference between a carrier frequency of the received signal and the frequency of an output signal of a local oscillator.

Means for Solving the Problems

The present invention has been made to solve the above problems, and the present invention is a frequency offset estimation apparatus which estimates a frequency offset which is the difference between a carrier frequency of a received signal and the frequency of an output signal of a local oscillator, the apparatus including: a frequency domain conversion unit that converts the received signal sampled in advance with a predetermined sampling frequency into a frequency domain, and outputs a frequency spectrum having N frequency components to which numbers from 1 to N (N is an arbitrary natural number) have been sequentially assigned in order of the size of a frequency; a frequency band limitation unit that limits a frequency band of negative frequency components which have frequency component numbers of 1 to N/2 of the frequency spectrum and a frequency band of positive frequency components which have frequency component numbers of N/2+1 to N of the frequency spectrum; and a frequency offset estimation control unit that calculates the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifts all frequency components of the frequency spectrum in a frequency domain until the absolute value of a power difference calculated from the power of the positive frequency components and the power of the negative frequency components is less than or equal to a predetermined threshold value, and estimates the frequency offset based on a shift amount until the absolute value is less than or equal to the threshold value.

In the frequency offset estimation apparatus of the present invention, when all the frequency components of the frequency spectrum are cyclically shifted in the frequency domain, if the power of the positive frequency components is larger than the power of the negative frequency components, the frequency offset estimation control unit may shift all the frequency components of the frequency spectrum in a negative direction by a predetermined size and may add N to a frequency component number after shift if the frequency component number after the shift is less than 1, and if the power of the positive frequency components is less than or equal to the power of the negative frequency components, the frequency offset estimation control unit may shift all the frequency components of the frequency spectrum in a positive direction by a predetermined size and may subtract N from a frequency component number after shift if the frequency component number after the shift exceeds N.

The present invention is a reception apparatus including: the frequency offset estimation apparatus of the present invention; a first frequency offset compensation unit that compensates for the frequency offset of the received signal based on the value of the frequency offset of the received signal estimated by the frequency offset estimation apparatus; a phase increment frequency offset estimation unit that estimates a frequency offset of the received signal which has been compensated by the first frequency offset compensation unit, based on a phase increment algorithm; and a second frequency offset compensation unit that compensates for the frequency offset based on the value of the frequency offset of the received signal estimated by the phase increment frequency offset estimation unit.

The present invention is a frequency offset estimation method which is used in a frequency offset estimation apparatus estimating a frequency offset which is the difference between a carrier frequency of a received signal and the frequency of an output signal of a local oscillator, the method including: a frequency domain conversion step of converting the received signal sampled in advance with a predetermined sampling frequency into a frequency domain, and outputting a frequency spectrum having N frequency components to which numbers from 1 to N (N is an arbitrary natural number) have been sequentially assigned in order of the size of a frequency; a frequency band limitation step of limiting a frequency band of negative frequency components which have frequency component numbers of 1 to N/2 of the frequency spectrum and a frequency band of positive frequency components which have frequency component numbers of N/2+1 to N of the frequency spectrum; and a frequency offset estimation control step of calculating the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifting all frequency components of the frequency spectrum in a frequency domain until the absolute value of a power difference calculated from the power of the positive frequency components and the power of the negative frequency components is less than or equal to a predetermined threshold value, and estimating the frequency offset based on a shift amount until the absolute value is less than or equal to the threshold value.

In the frequency offset estimation method of the present invention, in the frequency offset estimation control step, when all the frequency components of the frequency spectrum are cyclically shifted in the frequency domain, if the power of the positive frequency components is larger than the power of the negative frequency components, all the frequency components of the frequency spectrum may be shifted in a negative direction by a predetermined size and N may be added to a frequency component number after shift if the frequency component number after the shift is less than 1, and if the power of the positive frequency components is less than or equal to the power of the negative frequency components, all the frequency components of the frequency spectrum may be shifted in a positive direction by a predetermined size and N may be subtracted from a frequency component number after shift if the frequency component number after the shift exceeds N, so that the frequency spectrum is cyclically shifted.

The present invention is a reception method including: the steps of the frequency offset estimation method of the present invention; a first frequency offset compensation step of compensating for the frequency offset of the received signal based on the value of the frequency offset of the received signal estimated in the steps of the frequency offset estimation method; a phase increment frequency offset estimation step of estimating a frequency offset of the received signal which has been compensated in the first frequency offset compensation step, based on a phase increment algorithm; and a second frequency offset compensation step of compensating for the frequency offset based on the value of the frequency offset of the received signal estimated in the phase increment frequency offset estimation step.

The present invention is a frequency offset estimation apparatus which estimates the difference between a carrier frequency of a received signal and the frequency of an output signal of a local oscillator, the apparatus including: a frequency offset coarse estimation unit that estimates a frequency offset from a frequency spectrum of the received signal including two polarizations sampled in advance with a predetermined sampling frequency; a sweep frequency range control unit that determines a range of a sweep frequency based on a coarsely estimated value of the frequency offset coarse estimation unit; and a frequency offset fine estimation unit that estimates a frequency offset of the received signal based on the range of the sweep frequency determined by the sweep frequency range control unit, and the frequency offset fine estimation unit includes: a first operation unit that raises the two polarizations in the received signal to a $W^{th}$ power and converts the frequency of the received signal by subtracting the sweep frequency from the frequency of the received signal when rotational symmetry of constellation points on a constellation with no frequency offset of the received signal is defined as $2\pi/W$ (W: a positive integer); a second operation unit that averages or adds operation results of N (N: a positive integer) symbols of each polarization in the first operation unit, and calculates an absolute value or a power of the absolute value; a third operation unit that is provided as a next-stage of the second operation unit, adds operation results of the two polarizations or selects an operation result of polarization with a larger peak value, and adds or averages U (U: a positive integer) frames each including the N symbols; and a fourth operation unit that detects a sweep frequency at which an operation result of the third operation unit has a maximum value, and multiplies the sweep frequency by 1/W to estimate the frequency offset.

The present invention is a frequency offset estimation method which estimates the difference between a carrier frequency of a received signal and the frequency of an output signal of a local oscillator, the method including: a frequency offset coarse estimation step of estimating a frequency offset from a frequency spectrum of the received signal including two polarizations sampled in advance with a predetermined sampling frequency; a sweep frequency range control step of determining a range of a sweep frequency based on a coarsely estimated value estimated in the frequency offset coarse estimation step; and a frequency offset fine estimation step of estimating a frequency offset of the received signal based on the range of the sweep frequency determined in the sweep frequency range control step, and the frequency offset fine estimation step includes: a first operation step of raising the two polarizations in the received signal to a $W^{th}$ power and converting the frequency of the received signal by subtracting the sweep frequency from the frequency of the received signal when rotational symmetry of constellation points on a constellation with no frequency offset of the received signal is defined as $2\pi/W$ (W: a positive integer); a second operation step of adding or averaging operation results of N (N: a positive integer) symbols of each polarization in the first operation step, and calculating an absolute value or a power of the absolute value; a third operation step of adding operation results of the two polarizations or selecting an operation result of polarization with a larger peak value, and adding or averaging U (U: a positive integer) frames each including the N symbols, after the second operation step; and a fourth operation step of detecting a sweep frequency at which an operation result of the third operation step has a maximum value, and multiplying the sweep frequency by 1/W to estimate the frequency offset.

The present invention is a frequency offset estimation apparatus which estimates the difference between a carrier frequency of a received signal and the frequency of an output signal of a local oscillator, the apparatus including: a frequency offset coarse estimation unit that estimates a frequency offset from a frequency spectrum of the received signal including two polarizations sampled in advance with a predetermined sampling frequency; a frequency offset fine estimation unit that has a periodical frequency offset estimation characteristic with respect to the received signal or a signal obtained by compensating for dispersion of the received signal; and a frequency ambiguity elimination control unit that eliminates frequency ambiguity of a frequency offset which has been estimated by the frequency offset fine estimation unit, based on the value of the frequency offset estimated by the frequency offset coarse estimation unit, to estimate the frequency offset.

In the frequency offset estimation apparatus of the present invention, the frequency offset fine estimation unit may estimate the frequency offset of the received signal or the signal obtained by compensating for the dispersion of the received signal, based on a phase increment algorithm.

In the frequency offset estimation apparatus of the present invention, when rotational symmetry of constellation points on a constellation with no frequency offset of the received signal is defined as $2\pi/W$ (W: a positive integer), the frequency offset fine estimation unit may raise the two polarizations in the received signal to $W^{th}$ powers, may perform conversion into frequency spectrums, may calculate the absolute values of the results of the conversion or powers of the absolute values, may add the frequency spectrums of the two polarizations or selects a frequency spectrum of polarization with a larger peak value, may add or average frequency spectrums of U (U: a positive integer) frames each including N (N: a positive integer) symbols, and may detect a frequency at which the result of the operation has a maximum value.

In the frequency offset estimation apparatus of the present invention, when eliminating the frequency ambiguity and estimating the frequency offset, the frequency ambiguity elimination control unit may calculate frequencies serving as frequency offset candidates including the frequency ambiguity based on the frequency offset estimated by the frequency offset fine estimation unit, may set the center of frequencies of frequency offset candidates that are adjacent in a frequency domain as a boundary between the adjacent frequency offset candidates, may select an area including the value estimated by the frequency offset coarse estimation unit from areas based on boundaries in the frequency domain, and may select a frequency serving as a frequency offset candidate included in the selected area as an estimated value of the frequency offset.

In the frequency offset estimation apparatus of the present invention, the frequency offset coarse estimation unit may include: a frequency domain conversion unit that converts the received signal into a frequency domain, and outputs a frequency spectrum having N frequency components to which numbers from 1 to N (N is an arbitrary natural number) have been sequentially assigned in order of the size of a frequency; a frequency band limitation unit that limits a frequency band of negative frequency components which have frequency component numbers of 1 to N/2 of the frequency spectrum and a frequency band of positive frequency components which have frequency component numbers of N/2+1 to N of the frequency spectrum; and a frequency offset estimation control unit that calculates the sum of the squares of the positive frequency components of the frequency spectrum that have been subjected to frequency band limitation and the sum of the squares of the negative frequency component of the frequency spectrum that have been subjected to frequency band limitation to calculate power of the positive frequency components and power of the negative frequency components, and cyclically shifts all frequency components of the frequency spectrum in a frequency domain until the absolute value of a power difference calculated from the power of the positive frequency components and the power of the negative frequency components is less than or equal to a predetermined threshold value, and estimates the frequency offset based on a shift amount until the absolute value is less than or equal to the threshold value.

The present invention is a reception apparatus including: the frequency offset estimation apparatus of the present invention; a frequency offset compensation unit that compensates for the frequency offset of the received signal based on the value of the frequency offset of the received signal estimated by the frequency offset estimation apparatus; a phase compensation unit that compensates for the phase of the received signal compensated by the frequency offset compensation unit; and a decision unit that performs symbol decision on the received signal with the compensated phase.

The present invention is a frequency offset estimation method which estimates the difference between a carrier frequency of a received signal and the frequency of an output signal of a local oscillator, the method including: a frequency offset coarse estimation step of estimating a frequency offset from a frequency spectrum of the received signal including two polarizations sampled in advance with a predetermined sampling frequency; a frequency offset fine estimation step of providing a periodical frequency offset estimation characteristic with respect to the received signal or a signal obtained by compensating for dispersion of the received signal; and a frequency ambiguity elimination control step of eliminating frequency ambiguity of a frequency offset which has been estimated in the frequency offset fine estimation step, based on the value of the frequency offset estimated in the frequency offset coarse estimation step, and estimating the frequency offset.

In the frequency offset estimation method of the present invention, in the frequency offset fine estimation step, the frequency offset of the received signal or the signal obtained by compensating for the dispersion of the received signal may be estimated based on a phase increment algorithm.

In the frequency offset estimation method of the present invention, in the frequency offset fine estimation step, when rotational symmetry of constellation points on a constellation with no frequency offset of the received signal is defined as $2\pi/W$ (W: a positive integer), the two polarizations in the received signal may be raised to $W^{th}$ powers and may be converted into frequency spectrums, the absolute values of the result of the conversion or powers of the absolute values may be calculated, the frequency spectrums of the two polarizations may be added or a frequency spectrum of polarization with a larger peak value may be selected, frequency spectrums of U (U: a positive integer) frames each including N (N: a positive integer) symbols may be added or averaged, and a frequency at which the result of the operation has a maximum value may be detected.

In the frequency offset estimation method of the present invention, in the frequency ambiguity elimination control step, when eliminating the frequency ambiguity and estimating the frequency offset, frequencies serving as frequency offset candidates including the frequency ambiguity may be calculated based on the frequency offset estimated in the frequency offset fine estimation step, the center of frequencies of frequency offset candidates that are adjacent in a frequency domain may be set as a boundary between the adjacent frequency offset candidates, an area including the value estimated in the frequency offset coarse estimation step may be selected from areas based on boundaries in the frequency domain, and a frequency serving as a frequency offset candidate included in the selected area may be selected as an estimated value of the frequency offset.

In the frequency offset estimation method of the present invention, the frequency offset coarse estimation step may include: a frequency domain conversion step of converting the received signal into a frequency domain, and outputting a frequency spectrum having N frequency components to which numbers from 1 to N (N is an arbitrary natural number) have been sequentially assigned in order of the size of a frequency; a frequency band limitation step of limiting a frequency band of negative frequency components which have frequency component numbers of 1 to N/2 of the frequency spectrum and a frequency band of positive frequency components which have frequency component numbers of N/2+1 to N of the frequency spectrum; and a frequency offset estimation control step of calculating the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifting all frequency components of the frequency spectrum in a frequency domain until the absolute value of a power difference calculated from the power of the positive frequency components and the power of the negative frequency components is less than or equal to a predetermined threshold value, and estimating the frequency offset based on a shift amount until the absolute value is less than or equal to the threshold value.

The present invention is a reception method including: the steps of the frequency offset estimation method of the present invention; a frequency offset compensation step of compensating for the frequency offset of the received signal based on the value of the frequency offset of the received signal estimated by the frequency offset estimation method; a phase compensation step of compensating for the phase of the received signal compensated in the frequency offset compensation step; and a decision step of performing symbol decision on the received signal with the compensated phase.

Advantageous Effects of the Invention

In accordance with the present invention, when estimating a frequency offset which is the difference between a carrier frequency of a received signal and the frequency of an output signal of a local oscillator, all frequency components are shifted until the absolute value of a power difference between a power value of positive frequency components subjected to frequency band limitation and a power value of negative frequency components subjected to frequency band limitation in a frequency spectrum of the received signal is less than or equal to a predetermined threshold value, and the frequency offset is estimated based on a shift amount, so that it is possible to appropriately estimate the frequency offset of the received signal.

That is, as described above, all the frequency components are shifted until the absolute value of the power difference between the power value of the positive frequency components subjected to the frequency band limitation and the power value of the negative frequency components subjected to the frequency band limitation in the frequency spectrum of the received signal is less than or equal to the predetermined threshold value, and the frequency offset is estimated based on the shift amount, so that it is possible to estimate the frequency offset in a wideband as compared with a frequency offset estimation apparatus using a phase increment algorithm. Furthermore, since the method does not require a known pilot symbol and an NCO, it is possible to estimate the frequency offset with high accuracy at a high speed as compared with frequency offset estimation apparatuses using other wideband frequency spectrums.

Furthermore, in accordance with the present invention, when estimating the frequency offset, which is the difference between the carrier frequency of the received signal and the frequency of the output signal of the local oscillator, estimation is performed in a wide frequency range based on the value of a coarsely estimated frequency offset, so that it is possible to appropriately estimate the frequency offset of the received signal.

MODES FOR CARRYING OUT THE INVENTION

Hereinafter, embodiments of the present invention will be described with reference to the drawings. It is to be noted that, in each diagram, the same reference symbols are used to designate the same or corresponding configurations.

<First Embodiment>

Figure 1:
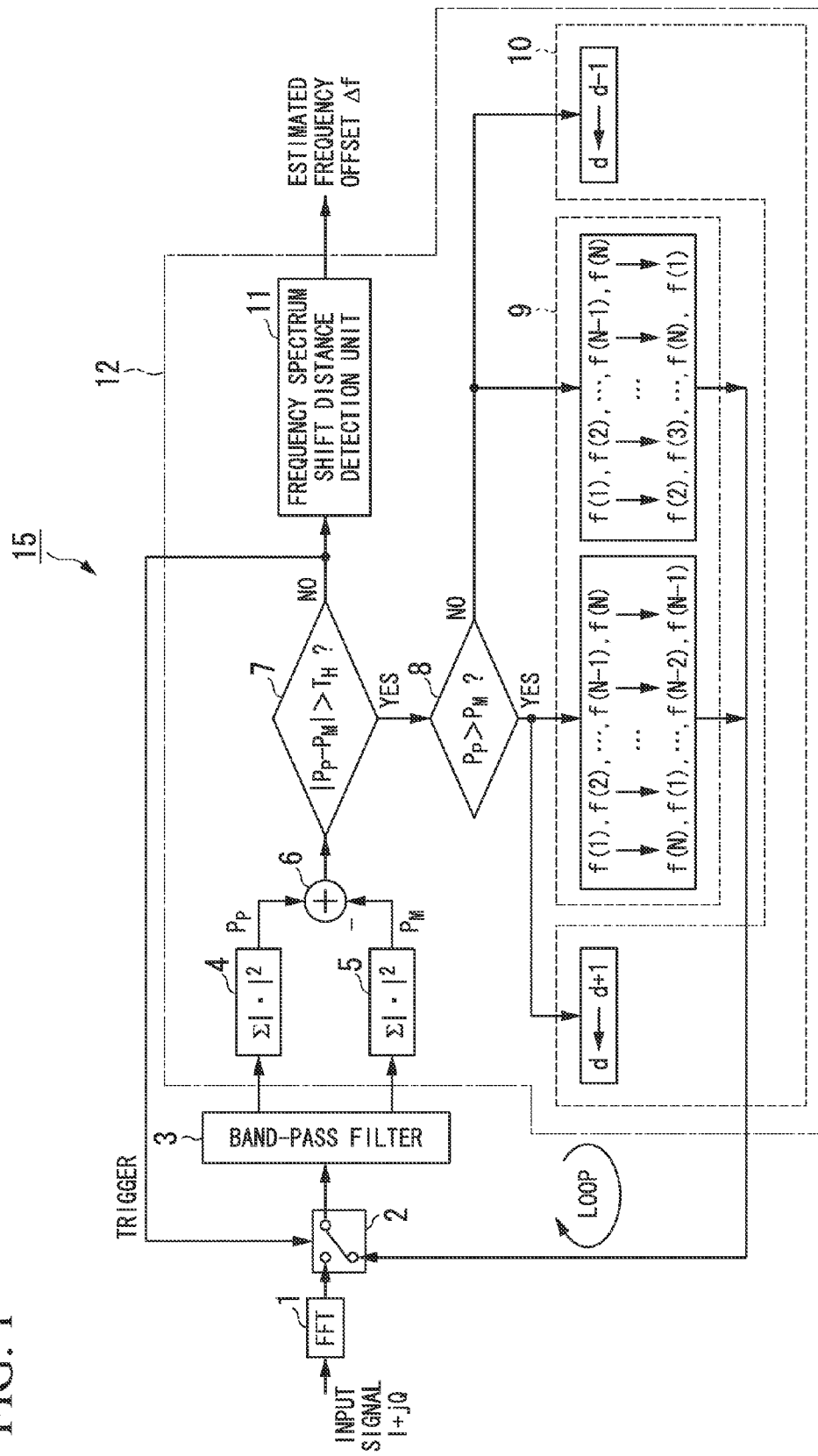
FIG. 1 is a block diagram illustrating a configuration example of a frequency offset estimation apparatus in accordance with a first embodiment of the present invention.

Hereinafter, a first embodiment of the present invention will be described with reference to the drawings. FIG. 1 is a schematic block diagram illustrating a configuration example of a frequency offset estimation apparatus 15 in accordance with the first embodiment of the present invention, which estimates a frequency offset that is the difference between a carrier frequency of a received signal and the frequency of an output signal of a reception-end local oscillator.

The frequency offset estimation apparatus 15 includes an FFT unit 1, a single pole, double throw (SPDT) switch 2, a band-pass filter 3, and a frequency offset estimation control unit 12. Moreover, the frequency offset estimation control unit 12 includes a first square addition unit 4, a second square addition unit 5, a subtraction unit 6, a first decision unit 7, a second decision unit 8, a frequency spectrum cyclic shift unit 9, a counter 10, and a frequency spectrum shift distance detection unit 11.

In FIG. 1, an input signal I+jQ is a complex signal obtained by sampling in advance the received signal with a predetermined sampling frequency.

The FFT unit 1 converts the input signal into a frequency spectrum in a frequency domain. For example, when the size of the FFT when the FFT unit 1 performs FFT is N (N is an arbitrary natural number), the FFT unit 1 outputs a frequency spectrum having N frequency components to which numbers from 1 to N have been sequentially assigned in order of the size of the frequency. Herein, subsequent signal processing will be described in which frequency components with frequency component numbers of 1 to N/2 of the frequency spectrum are denoted as negative frequency components and frequency components with frequency component numbers of N/2+1 to N of the frequency spectrum are denoted as positive frequency components.

The SPDT switch 2 switches a signal which is input to the band-pass filter 3 under control of the first decision unit 7, which will be described later. The SPDT switch 2 performs switching such that an output signal of the FFT unit 1 is input to the band-pass filter 3 when response of the first decision unit 7 is NO, and an output signal of the frequency spectrum cyclic shift section 9 is input to the band-pass filter 3 when the response of the first decision unit 7 is YES.

In initial setting, the response of the first decision unit 7 is NO, a common terminal of the SPDT switch 2 is connected to an upper contact, and the SPDT switch 2 passes through the output signal of the FFT unit 1 to input to the band-pass filter 3.

The band-pass filter 3 limits a frequency band of the signal input by passing through the SPDT switch 2. Here, the band-pass filter 3 limits the frequency bands of the positive frequency component signals and the negative frequency component signals of the received signal converted into the frequency spectrum in the FFT unit 1 such that the positive and the negative are symmetrical to each other about the center frequency of the frequency components 1 to N, outputs signals of the frequency components in a positive pass band to the first square addition unit 4, and outputs signals of the frequency components in a negative pass band to the second square addition unit 5.

The first square addition unit 4 and the second square addition unit 5 calculate a power value $P_P$ of the frequency components in the positive pass band of the band-pass filter 3 and a power value $P_M$ of the frequency components in the negative pass band of the band-pass filter 3, respectively. The subtraction unit 6 calculates the power difference between the two power values $P_P$ and $P_M$.

Figure 2:
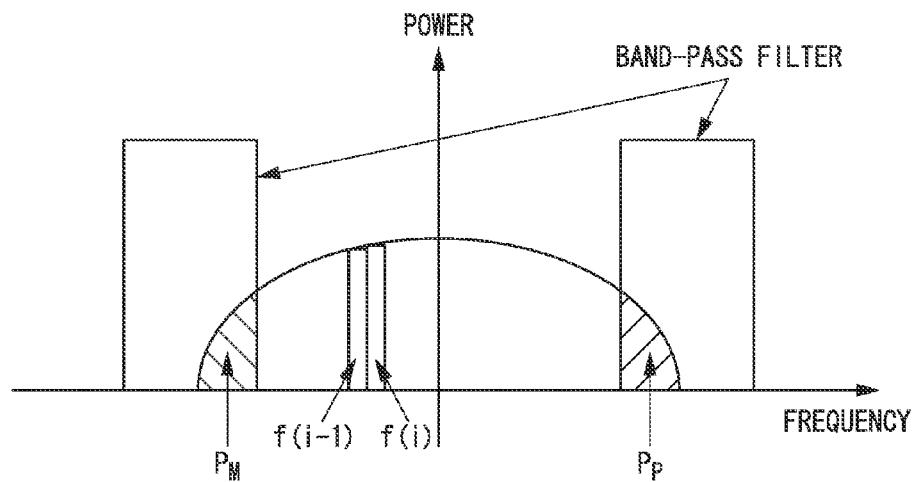
FIG. 2 is an explanatory diagram illustrating the outline of an operation of the first embodiment, and is an explanatory diagram illustrating a frequency spectrum when there is no frequency offset.
Figure 3:
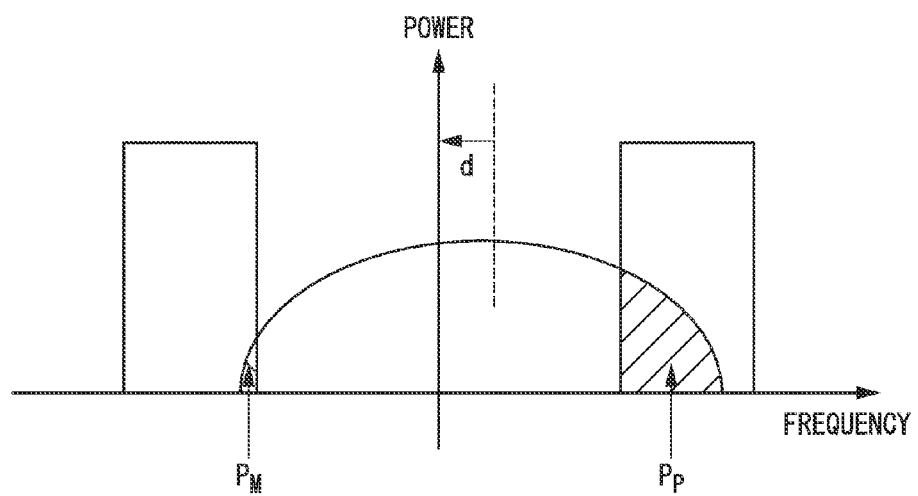
FIG. 3 is an explanatory diagram illustrating the outline of an operation of the first embodiment, and is an explanatory diagram illustrating a frequency spectrum when there is a frequency offset.

Here, FIG. 2 and FIG. 3 are explanatory diagrams illustrating the outline of an operation for calculating the power value $P_P$ of the frequency components in the positive pass band of the band-pass filter 3 and the power value $P_M$ of the frequency components in the negative pass band of the band-pass filter 3 with respect to the received signal converted into the frequency spectrum. In FIG. 2 and FIG. 3, a horizontal axis denotes a frequency and a vertical axis denotes power.

For the signal converted into the frequency spectrum in the frequency domain in the FFT unit 1, the band-pass filter 3 multiplies the signal of each frequency component by a transfer function of the band-pass filter 3. For example, when the band-pass filter 3 uses a rectangular filter, the band-pass filter 3 multiplies a frequency component of a pass band by 1 and multiplies a frequency component of a stop band by 0. The first square addition unit 4 and the second square addition unit 5 each square the frequency components of the pass band and obtain the total sum thereof, thereby calculating the power value $P_P$ and the power value $P_M$, which are the sum-total power of the frequency components in the positive pass band of the band-pass filter 3 and the sum-total power of the frequency components in the negative pass band of the band-pass filter 3, respectively.

As illustrated in FIG. 2, when there is no frequency offset, the power value $P_P$ of the positive frequency components are equal to the power value $P_M$ of the negative frequency components due to the symmetry of the frequency spectrum. In contrast, as illustrated in FIG. 3, when there is a frequency offset, since the frequency spectrum is biased in the positive direction or the negative direction, a power difference occurs between the power value $P_P$ of the positive frequency components and the power value $P_M$ of the negative frequency components.

Next, the first decision unit 7 of FIG. 1 compares the absolute value of the power difference between the power value $P_P$ and the power value $P_M$ with a predetermined threshold value $T_H$ to determine the magnitude relation. When the first decision unit 7 performs response of YES because the absolute value of the power difference between the power value $P_P$ and the power value $P_M$ is larger than the predetermined threshold value $T_H$, the first decision unit 7 starts the process of the second decision unit 8, and the contact of the SPDT switch 2 is switched to change the input signal to the band-pass filter 3 from the output signal of the FFT unit 1 to the output signal of the frequency spectrum cyclic shift unit 9.

The second decision unit 8 compares the power value $P_P$ with the power value $P_M$ to determine the magnitude relation. Based on the result of the determination, that is, the result obtained by determining whether the frequency spectrum is biased in the positive direction or the negative direction, the second decision unit 8 selects shift control of the frequency spectrum cyclic shift unit 9 and the counter 10 and notifies them of the shift control. The frequency spectrum cyclic shift unit 9 shifts all the frequency components in the frequency domain in a direction in which the biasing in the positive direction or the negative direction of the frequency components, which has been determined by the second decision unit 8, is reduced. The counter 10 counts and holds the number of times of shifts in the positive direction and the number of times of shifts in the negative direction.

Here, control for shifting all the frequency components in the frequency domain will be described.

This shift is a cyclic shift such that, when the frequency component numbers of the frequency spectrum converted in the FFT unit 1 are 1 to N, the frequency component numbers are 1 to N even after the shift. That is, when a frequency component number after the shift is smaller than 1, N is added to the frequency component number, and when a frequency component number after the shift exceeds N, N is subtracted from the frequency component number.

If the second decision unit 8 has determined that the power value $P_P$ is larger than the power value $P_M$, the frequency spectrum cyclic shift unit 9 cyclically shifts the frequency components by one in the negative direction, and increases the value d of the counter 10 by 1. In contrast, if the second decision unit 8 has determined that the power value $P_P$ is smaller than the power value $P_M$, the frequency spectrum cyclic shift unit 9 cyclically shifts the frequency components by one in the positive direction, and decreases the value d of the counter 10 by 1.

Furthermore, since the contact of the SPDT switch 2 at this time is changed such that the output signal of the frequency spectrum cyclic shift unit 9 is input to the band-pass filter 3, the frequency spectrum cyclically shifted by the frequency spectrum cyclic shift unit 9 is input to the band-pass filter 3 again, signal processing is performed in sequence of the first square addition unit 4, the second square addition unit 5, and the subtraction unit 6, so that the power difference between the power value $P_P$ and the power value $P_M$ is calculated and input to the first decision unit 7. The signal processing of this loop is repetitively performed until determination in the first decision unit 7 becomes NO. That is, the signal processing of the loop is repetitively performed until the absolute value of the power difference between the power value $P_P$ and the power value $P_M$ is determined to be less than or equal to the predetermined threshold value $T_H$.

When determination in the first decision unit 7 is NO, the signal processing of the loop converges, and the frequency spectrum shift distance detection unit 11 detects the value d of the counter 10 at the time of the convergence. This value is the total sum of shift distances in the frequency domain of the frequency spectrum, and a frequency offset is estimated based on a frequency corresponding to a shift amount which is the total sum of the shift distances.

In this way, the frequency offset estimation is completed, the first decision unit 7 switches the contact of the SPDT switch 2 such that the output signal of the FFT unit 1 is input to the band-pass filter 3, and frequency spectrum data is newly input to the loop signal processing from the FFT unit 1, so that the frequency offset estimation is started.

Figure 4:
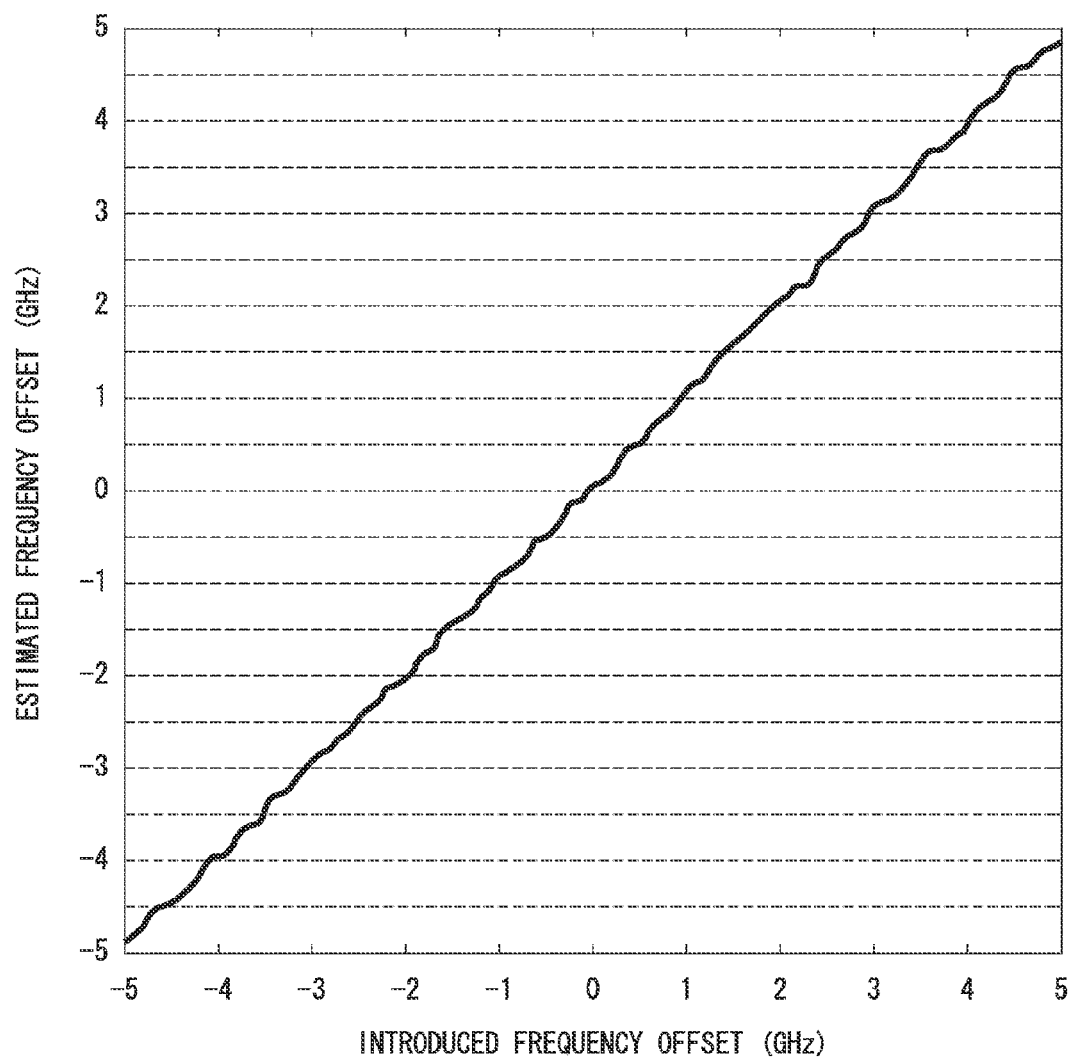
FIG. 4 is an explanatory diagram illustrating an example of the result obtained by simulating an operation of the first embodiment.
Figure 5:
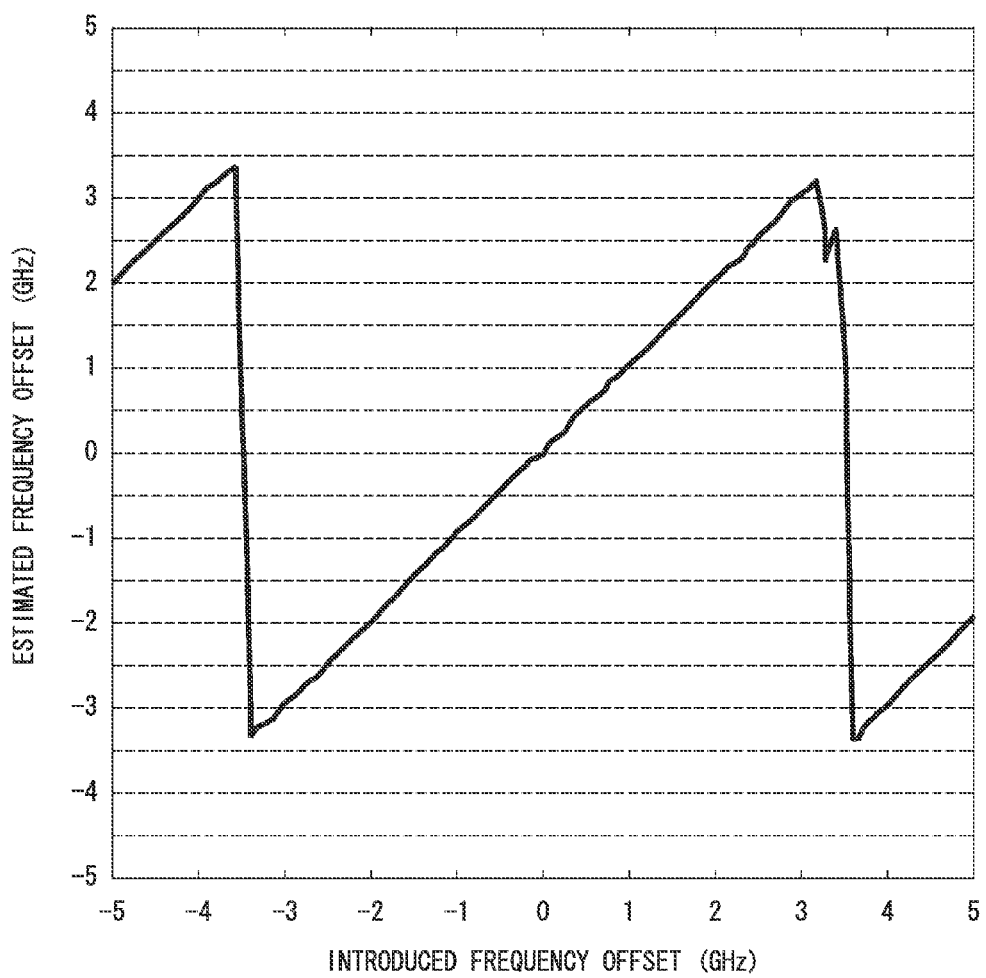
FIG. 5 is an explanatory diagram illustrating an example of the result obtained by simulating an operation of a conventional frequency offset estimation apparatus using a phase increment algorithm.

FIG. 4 is an explanatory diagram illustrating an example of the result obtained by simulating the operation of the first embodiment, and FIG. 5 is an explanatory diagram illustrating an example of the result obtained by simulating the operation of the conventional frequency offset estimation apparatus using a phase increment algorithm for a comparison with FIG. 4.

In FIG. 4 and FIG. 5, a horizontal axis denotes an introduced frequency offset and a vertical axis denotes an estimated frequency offset. A modulation scheme is 112 Gbit/s dual-polarization quadrature phase shift keying (QPSK), and a symbol rate $R_S$ is 28 Gbaud.

In the conventional frequency offset estimation apparatus using the phase increment algorithm illustrated in FIG. 5, estimation with high accuracy is possible in the range of $\pm R_S/2M$ (=$\pm 3.5$ GHz, the number of phases, M is 4); however, an estimation result is incorrect beyond this range due to the phase ambiguity. In contrast, in the first embodiment illustrated in FIG. 4, it can be understood that estimation with high accuracy is possible over a wideband of $\pm 5$ GHz.

As described with reference to FIG. 1 to FIG. 4, when estimating the frequency offset that is the difference between the carrier frequency of the received signal and the frequency of the output signal of the local oscillator, the frequency offset estimation apparatus 15 of the first embodiment cyclically shifts all the frequency components until the absolute value of the power difference between the power value $P_P$ of the positive frequency components and the power value $P_M$ of the negative frequency components is less than or equal to the predetermined threshold value that have been subjected to the frequency band limitation in the frequency spectrum of the received signal, and estimates the frequency offset based on the shift amount thereof.

Figure 17:
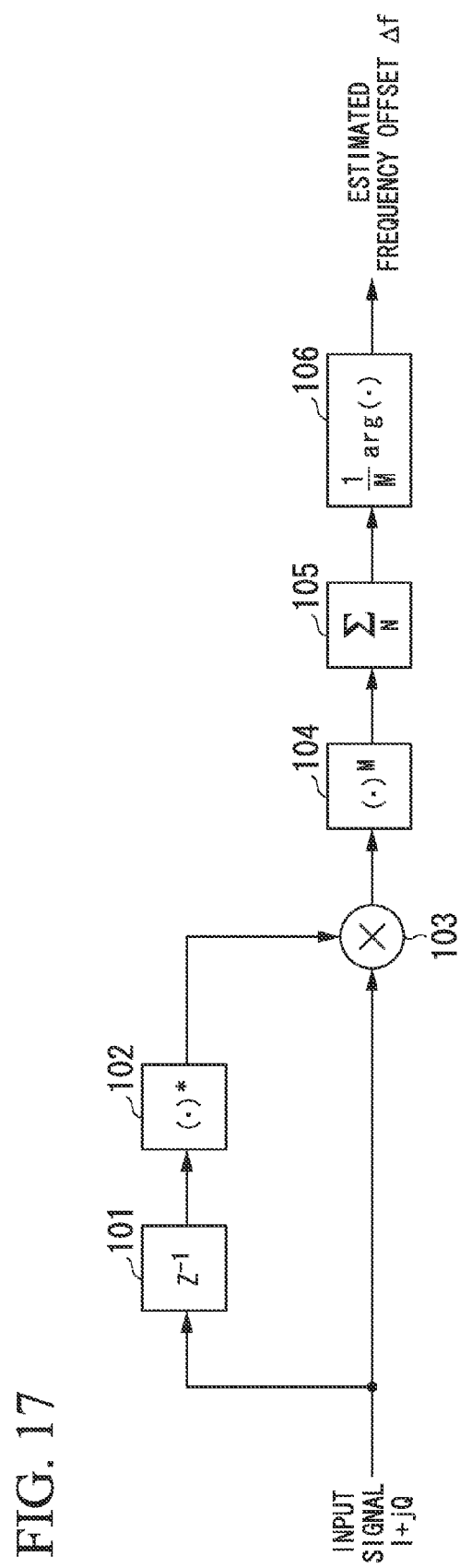
FIG. 17 is a block diagram illustrating a configuration example of a conventional frequency offset estimation apparatus using a phase increment algorithm.
Figure 18:
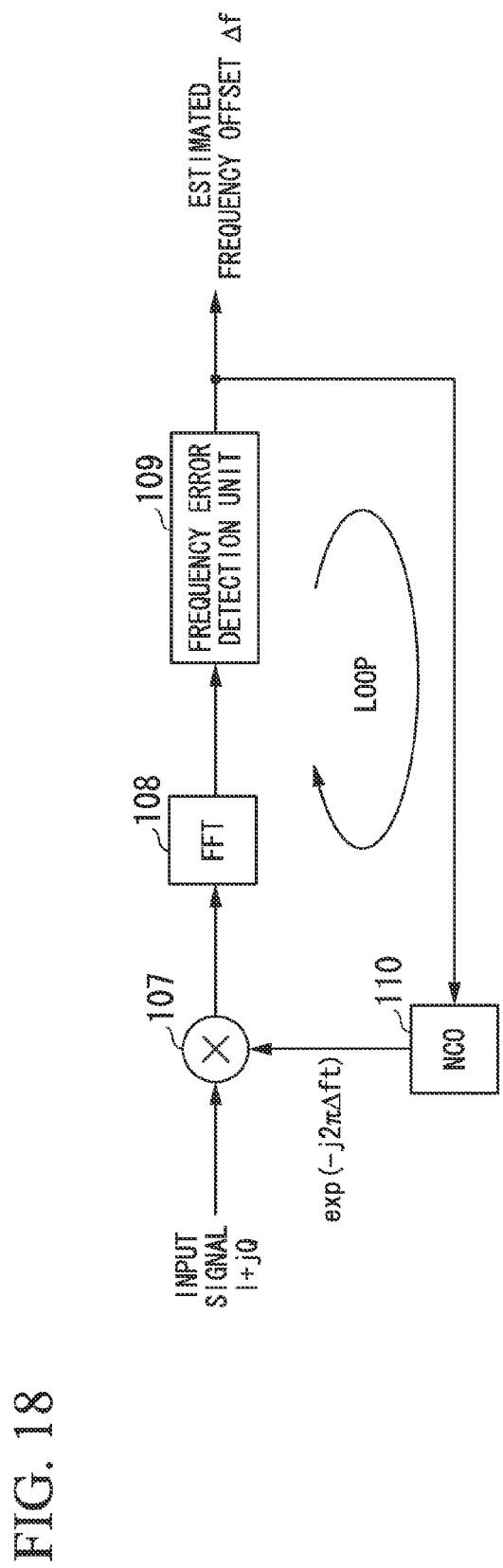
FIG. 18 is a block diagram illustrating a configuration example of a conventional frequency offset estimation apparatus using a frequency spectrum.
Figure 19:
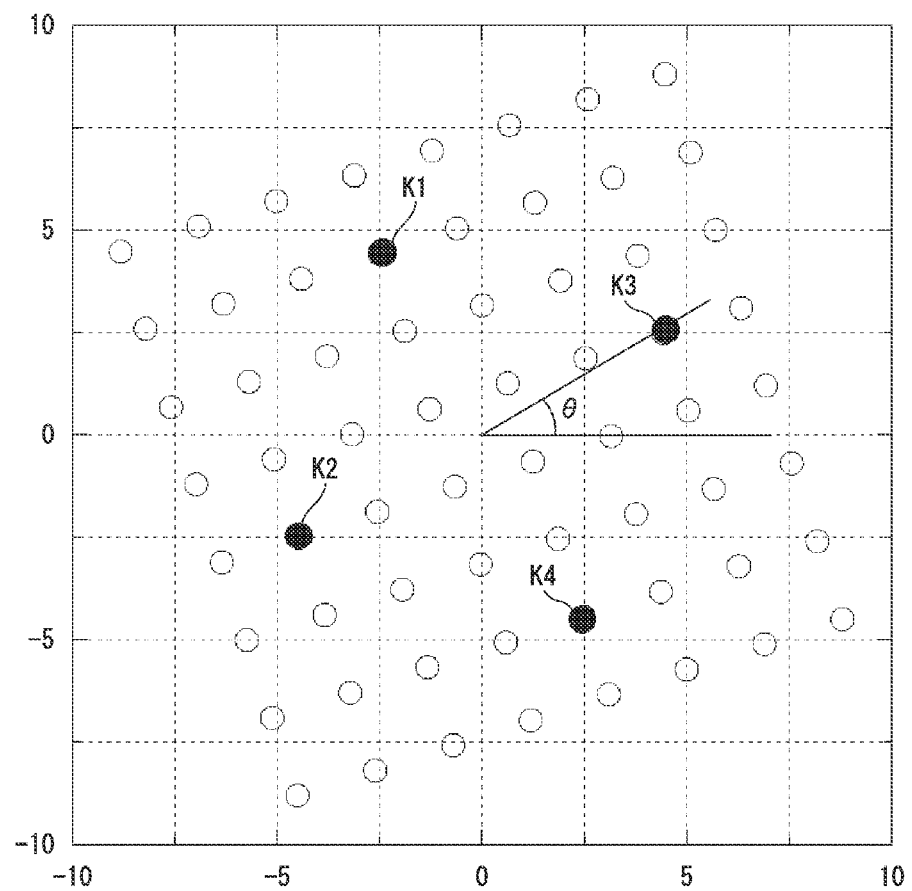
FIG. 19 is a first explanatory diagram illustrating the operation of a conventional frequency offset estimation method.
Figure 20:
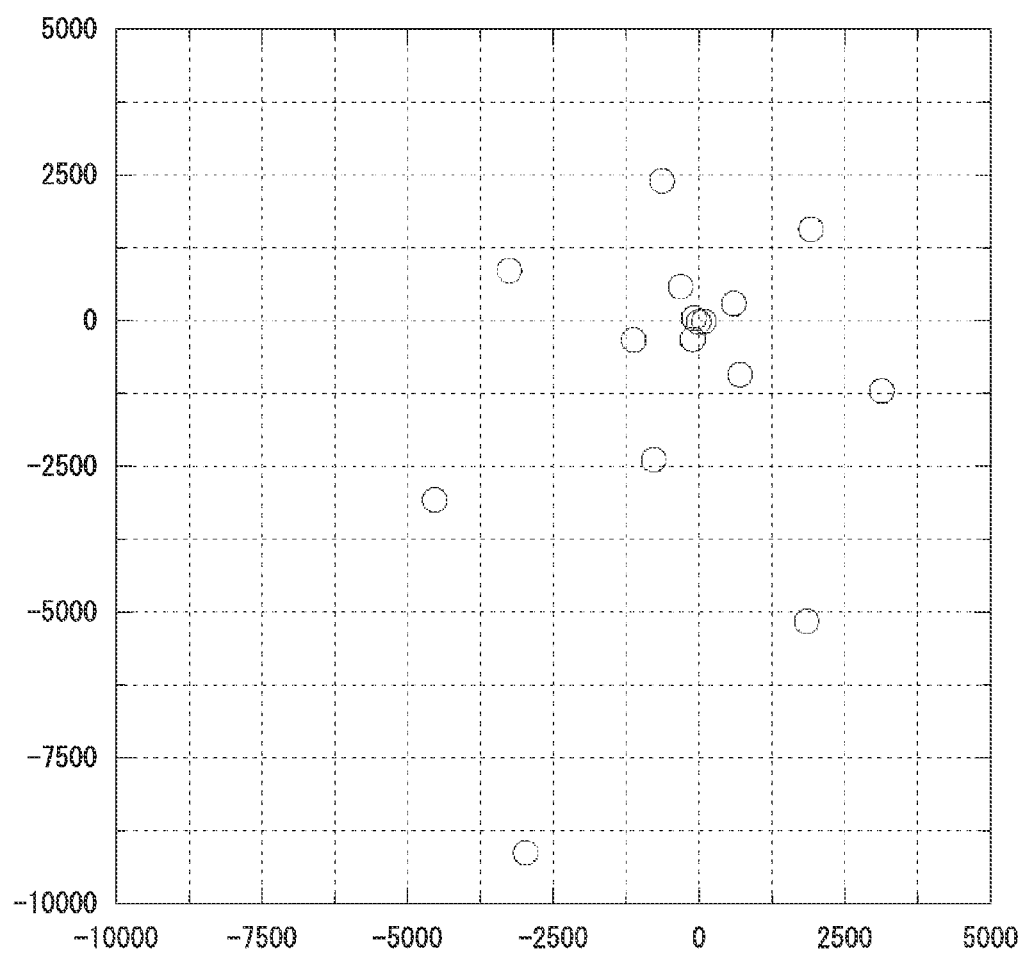
FIG. 20 is a second explanatory diagram illustrating the operation of the conventional frequency offset estimation method.
Figure 21:
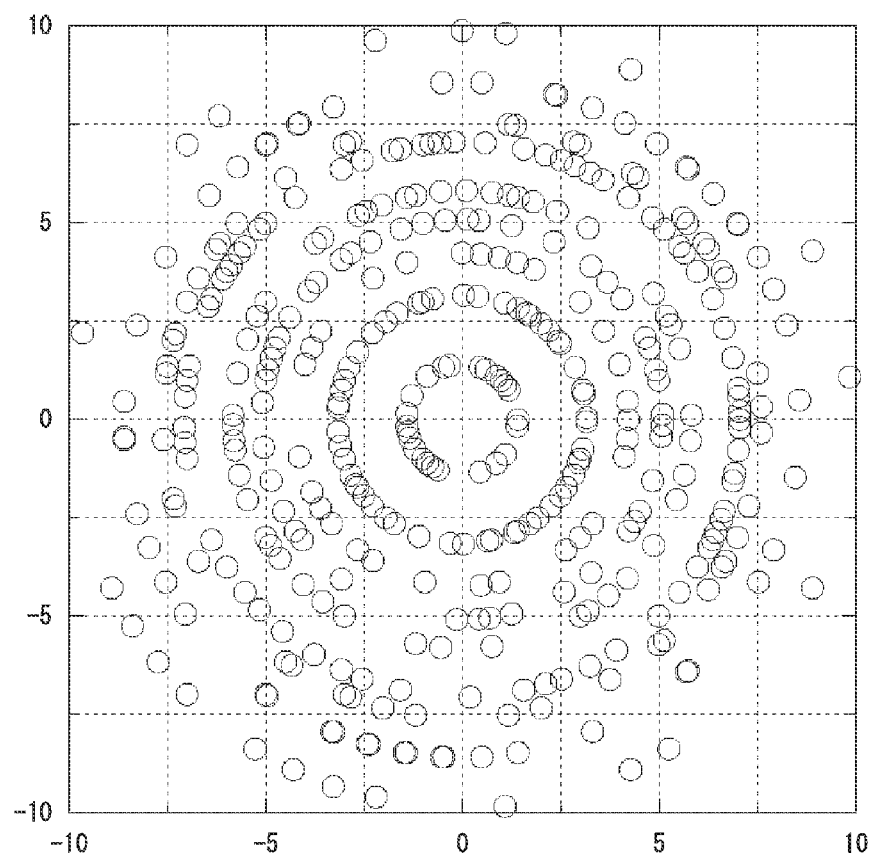
FIG. 21 is a third explanatory diagram illustrating the operation of the conventional frequency offset estimation method.
Figure 22:
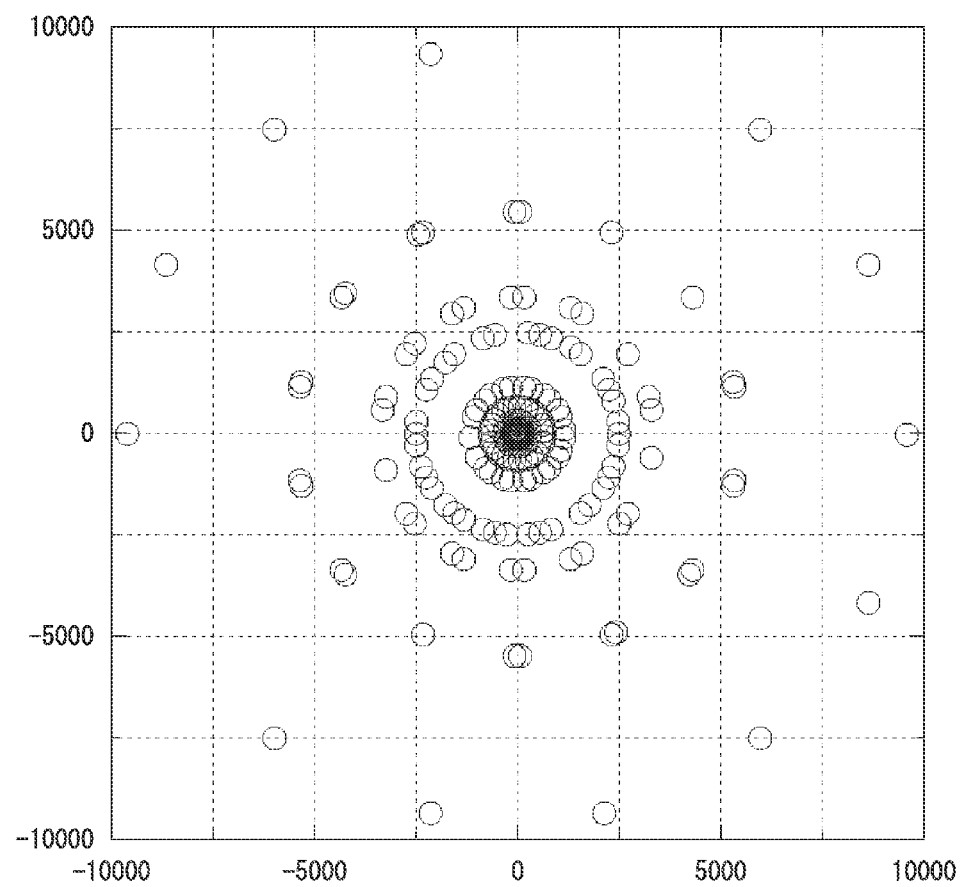
FIG. 22 is a fourth explanatory diagram illustrating the operation of the conventional frequency offset estimation method.

Consequently, it is possible for the frequency offset estimation apparatus 15 of the first embodiment to estimate a frequency offset in a wideband, as compared with the range of a frequency offset which can be estimated by the conventional frequency offset estimation apparatus using the phase increment algorithm illustrated in FIG. 17. Furthermore, the method in accordance with the first embodiment is a method requiring neither the known pilot symbol nor the NCO used in the conventional frequency offset estimation apparatus illustrated in FIG. 18. Therefore, in accordance with the present embodiment, it is not necessary to receive an input signal with the number of samples equal to the size of the FFT, i.e., several hundreds to several thousands, when the FFT is performed for each frequency which is changed in a stepwise manner. Thus, in accordance with the present embodiment, it is possible to estimate a frequency offset with high accuracy at a high speed.

Furthermore, in the frequency offset estimation apparatus 15 of the first embodiment, the size of the cyclic shift of the frequency components is not limited to 1. Therefore, when the absolute value of the power difference between the power value $P_P$ and the power value $P_M$ is large, the size of the cyclic shift may be increased, and when the absolute value of the power difference between the power value $P_P$ and the power value $P_M$ approaches the threshold value $T_H$, the size of the cyclic shift may be decreased. Consequently, it is possible to estimate a frequency offset at a higher speed.

It is to be noted that the predetermined threshold value $T_H$ of the first decision unit 7 can be determined from the power of the input signal. For example, assuming that the frequency spectrum of the output signal of the FFT unit 1 is a uniform rectangle and the total sum of all the power values of the frequency spectrum is denoted as a power value $P_{TOTAL}$, when the frequency components are cyclically shifted by 1 in the negative direction, the power value $P_P$ is decreased by $P_{TOTAL}/N$ and the power value $P_M$ is increased by $P_{TOTAL}/N$ as compared with those before the shift. Thus, the difference between the power value $P_P$ and the power value $P_M$ is changed by $2P_{TOTAL}/N$. At this time, when the threshold value $T_H$ is set as about $2P_{TOTAL}/N$, it is possible to estimate a frequency offset with an accuracy of nearly one frequency component. When a short estimation processing time is required even by sacrificing estimation accuracy, the threshold value $T_H$ may be increased.

It is to be noted that the size of the FFT unit 1, N, can be determined from required estimation accuracy and an estimation processing time. In general, as N becomes smaller, the estimation accuracy is degraded, but the estimation processing time is shortened.

Furthermore, after a plurality of estimated frequency offsets output from the frequency spectrum shift distance detection unit 11 are stored, arithmetic averaging may be performed, or averaging using a forgetting factor may be performed to follow a temporal variation.

It is to be noted that the FFT unit 1, which converts the input signal into the frequency spectrum, may use short time Fourier transform, discrete Fourier transform, wavelet transform, or other frequency analysis methods as a frequency analysis method as well as the fast Fourier transform.

Furthermore, a filter that limits a frequency band is not limited to a band-pass filter, and a low pass filter, a high pass filter, or other filters for limiting a frequency band may be used based on the characteristics of a received signal, instead of the band-pass filter 3.

<Second Embodiment>

Hereinafter, a second embodiment of the present invention will be described with reference to the drawings. The second embodiment relates to a reception apparatus having a configuration in which two types of frequency estimation apparatuses have been combined; that is, the frequency offset estimation apparatus 15 described in the first embodiment coarsely estimates a frequency offset and compensates for the frequency offset using the estimated value, and then the conventional frequency offset estimation apparatus using the phase increment algorithm estimates a frequency offset and compensates for the frequency offset.

Figure 6:
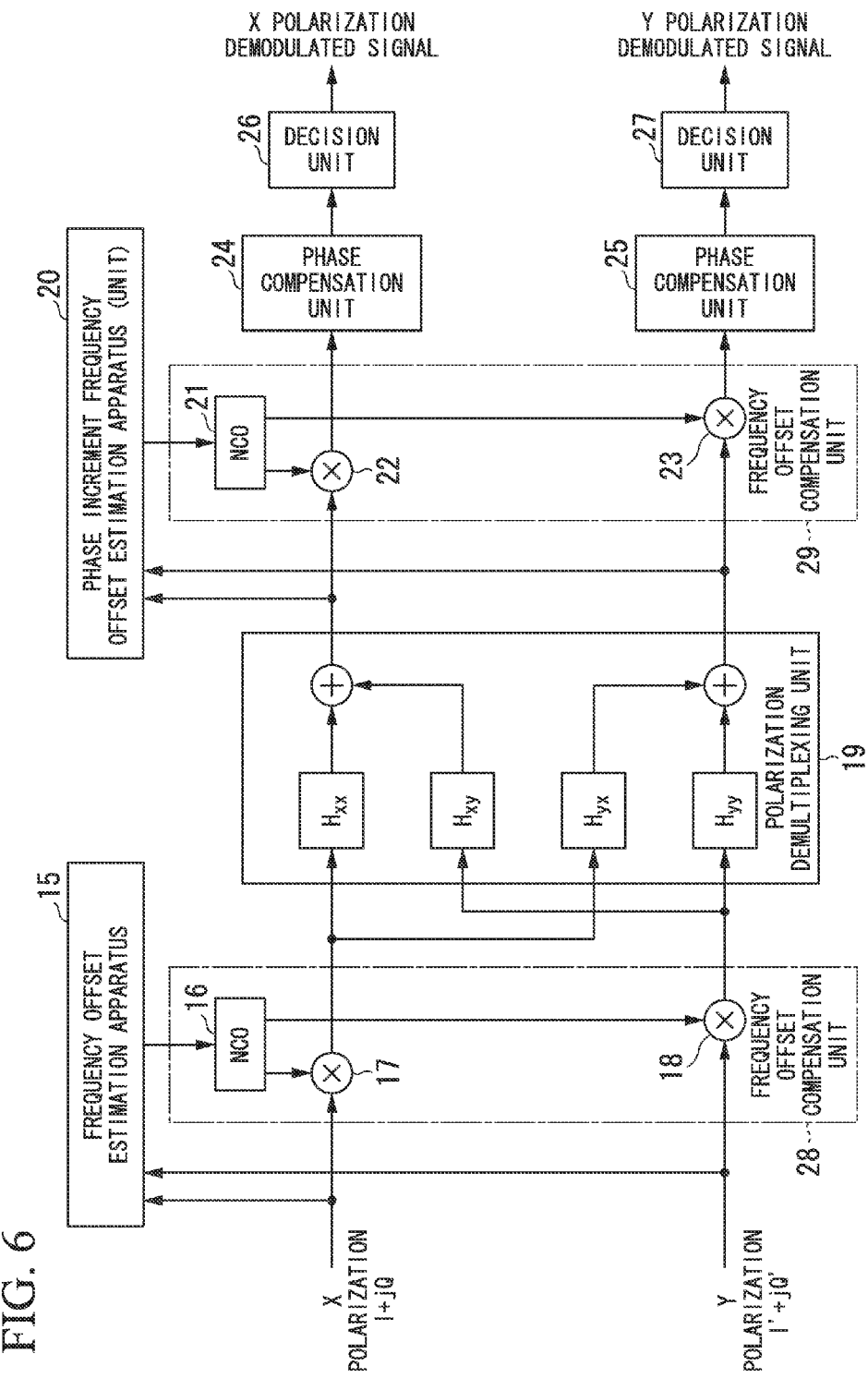
FIG. 6 is a block diagram illustrating a configuration example of a reception apparatus in accordance with a second embodiment of the present invention.

FIG. 6 is a schematic block diagram illustrating a configuration example of the reception apparatus in accordance with the second embodiment of the present invention.

The reception apparatus includes a frequency offset estimation apparatus 15, a first frequency offset compensation unit 28, a polarization demultiplexing unit 19, a phase increment frequency offset estimation apparatus 20, a second frequency offset compensation unit 29, a first phase compensation unit 24, a second phase compensation unit 25, a first decision unit 26, and a second decision unit 27. Here, the phase increment frequency offset estimation apparatus 20 has the same configuration as the conventional frequency offset estimation apparatus using the phase increment algorithm and having the configuration example illustrated in FIG. 17. Since the frequency offset estimation apparatus 15 illustrated in FIG. 6 corresponds to the configuration described in the first embodiment illustrated in FIG. 1, a description thereof will be omitted.

The first frequency offset compensation unit 28 includes a first NCO 16, a first multiplication unit 17, and a second multiplication unit 18.

The second frequency offset compensation unit 29 includes a second NCO 21, a third multiplication unit 22, and a fourth multiplication unit 23.

An input signal I+jQ and an input signal I'+jQ' are complex signals obtained by sampling in advance received signals of X polarization and Y polarization with a predetermined sampling frequency, respectively.

In the second embodiment, initially, the frequency offset estimation apparatus 15 coarsely estimates a frequency offset of the input signal I+jQ and the input signal I'+jQ' in a wideband. Here, the frequency offset estimation apparatus 15 is designed to satisfy the following condition. The condition is that when the phase increment frequency offset estimation apparatus 20 estimates a frequency offset of input signals obtained by compensating for the frequency offset coarsely estimated by the frequency offset estimation apparatus 15, the frequency offset of the input signals falls within a frequency range over which the phase increment frequency offset estimation apparatus 20 can estimate the frequency offset without the frequency ambiguity.

Next, the estimated frequency offset coarsely estimated by the frequency offset estimation apparatus 15 is input to the first frequency offset compensation unit 28. The first frequency offset compensation unit 28 then compensates for the frequency offset of the input signals.

That is, an oscillation frequency of the first NCO 16 provided in the first frequency offset compensation unit 28 is adjusted based on the coarsely estimated frequency offset. Then, the first multiplication unit 17 and the second multiplication unit 18 provided in the first frequency offset compensation unit 28 multiply the input signal I+jQ and the input signal I'+jQ' by a signal having the adjusted oscillation frequency of the first NCO 16, so that the frequency offset of the input signal I+jQ and the input signal I'+jQ' are compensated for.

The polarization demultiplexing unit 19 performs polarization demultiplexing and residual dispersion elimination on signals obtained by compensating for the frequency offset of the input signal I+jQ and the input signal I'+jQ' in the first frequency offset compensation unit 28. The phase increment frequency offset estimation apparatus 20 receives signals output from the polarization demultiplexing unit 19, and estimates a frequency offset.

The estimated frequency offset estimated in the phase increment frequency offset estimation apparatus 20 is input to the second frequency offset compensation unit 29. The second frequency offset compensation unit 29 then compensates for the frequency offset of input signals.

That is, an oscillation frequency of the second NCO 21 provided in the second frequency offset compensation unit 29 is adjusted based on the estimated frequency offset estimated in the phase increment frequency offset estimation apparatus 20. Then, the third multiplication unit 22 and the fourth multiplication unit 23 provided in the second frequency offset compensation unit 29 multiplies the input signals to the second frequency offset compensation unit 29 by a signal having the adjusted oscillation frequency of the second NCO 21, so that the frequency offset of the input signals to the second frequency offset compensation unit 29 is compensated for.

Next, the first phase compensation unit 24 and the second phase compensation unit 25 compensate for the phases of signals with the frequency offset compensated for in the second frequency offset compensation unit 29, and output to the first decision unit 26 and the second decision unit 27. The first decision unit 26 and the second decision unit 27 perform symbol decision to generate demodulated signals.

In this way, in the reception apparatus provided with the frequency offset estimation apparatuses of the second embodiment, input signals are compensated based on a frequency offset value coarsely estimated in the frequency offset estimation apparatus 15, and then are input to the conventional phase increment frequency offset estimation apparatus 20. Furthermore, the polarization demultiplexing and the residual dispersion elimination are also performed, so that it is possible to estimate a frequency offset of input signals having a small frequency offset and a small dispersion value, using the phase increment algorithm. Consequently, in the reception apparatus provided with the frequency offset estimation apparatuses of the second embodiment, it is possible to estimate and compensate for the frequency offset of received signals with high accuracy in a wideband, and to perform demodulation.

In a frequency offset estimation apparatus using a frequency spectrum, when the cutoff frequency of a band-pass filter on a transmission path or a low pass filter in a receiver is small and a frequency offset is large, one side of the frequency spectrum may be cut and the frequency spectrum may become asymmetric. In contrast, in the frequency offset estimation apparatuses of the second embodiment, the frequency offset estimation apparatus 15 coarsely estimates and compensates for a frequency offset, and then the conventional phase increment frequency offset estimation apparatus 20 further estimates a frequency offset. Thus, in the frequency offset estimation apparatuses of the second embodiment, even when the cutoff frequency of the band-pass filter on the transmission path or the low pass filter of the receiver is small and the frequency offset is large, it is possible to prevent the estimation accuracy of the frequency offset from being degraded.

It is to be noted that the signals input to the phase increment frequency offset estimation apparatus 20 may be the signals with the frequency offset compensated for in the first frequency offset compensation unit 28 before being input to the polarization demultiplexing unit 19, instead of the output signals of the polarization demultiplexing unit 19. However, when the signals subjected to the polarization demultiplexing and the residual dispersion elimination in the polarization demultiplexing unit 19 are input to the phase increment frequency offset estimation apparatus 20, it is possible to estimate a frequency offset with higher accuracy.

<Third Embodiment>

Hereinafter, a third embodiment of the present invention will be described with reference to the drawings.

As described above, in the reception apparatus of the second embodiment, input signals are compensated based on a value coarsely estimated in the frequency offset estimation apparatus 15. In contrast, a reception apparatus of the third embodiment has a configuration of estimating a frequency offset by eliminating the ambiguity in phase when the phase is detected using the conventional phase increment algorithm, based on the value coarsely estimated in the frequency offset estimation apparatus 15, without compensating the input signals. It is to be noted that, in the reception apparatus of the present embodiment, it is possible to use the invention disclosed in Non-Patent Document 3, instead of the frequency offset estimation apparatus of the first embodiment.

Figure 7:
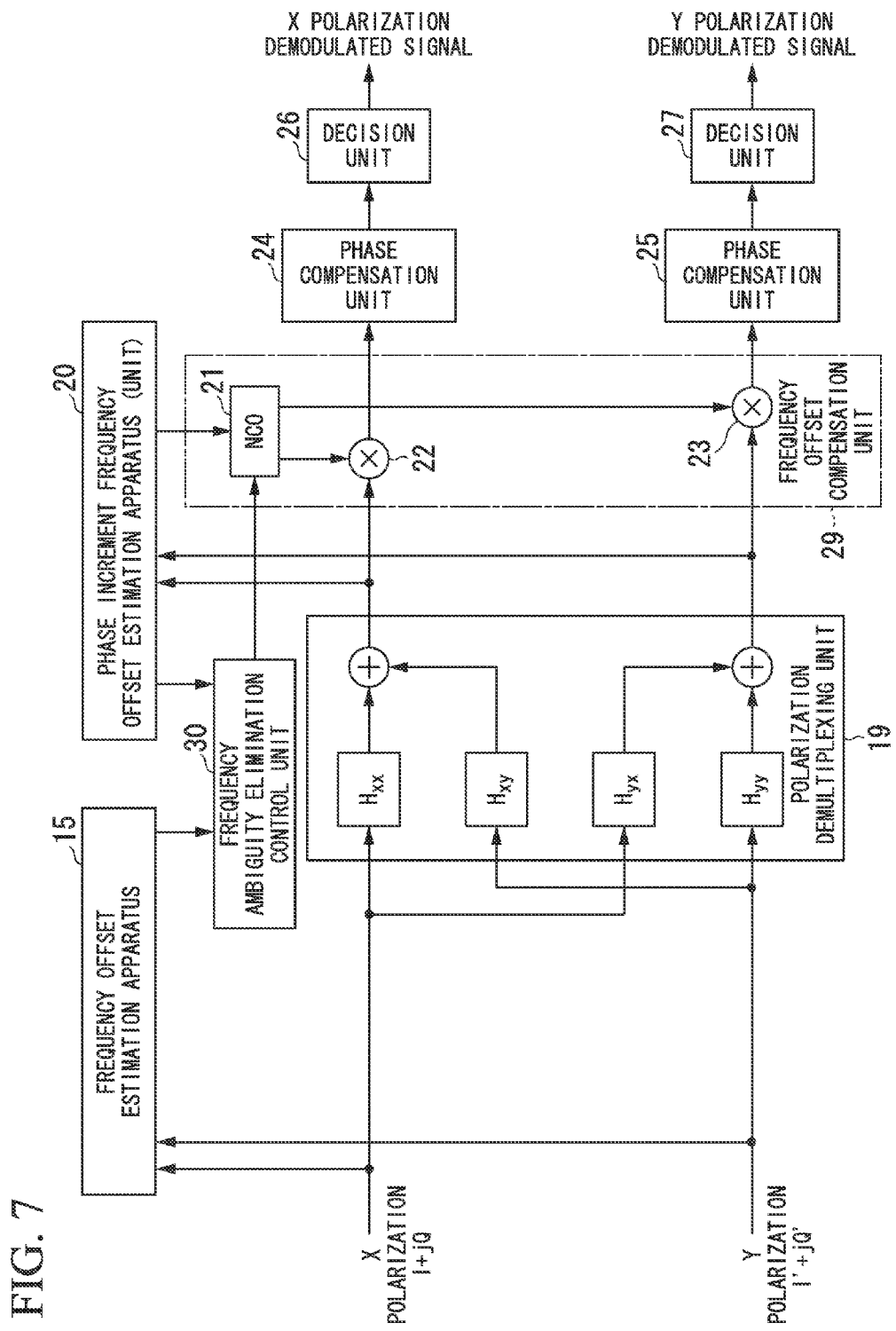
FIG. 7 is a block diagram illustrating a configuration example of a reception apparatus in accordance with a third embodiment of the present invention.

FIG. 7 is a schematic block diagram illustrating a configuration example of the reception apparatus in accordance with the third embodiment of the present invention.

The reception apparatus includes a frequency offset estimation apparatus 15, a frequency ambiguity elimination control unit 30, a polarization demultiplexing unit 19, a phase increment frequency offset estimation apparatus 20, a frequency offset compensation unit 29, a first phase compensation unit 24, a second phase compensation unit 25, a first decision unit 26, and a second decision unit 27. The frequency offset compensation unit 29 includes an NCO 21, a first multiplication unit 22, and a second multiplication unit 23.

Since the frequency offset estimation apparatus 15 has the configuration described in the first embodiment, a description thereof will be omitted.

In FIG. 7, since the same reference symbols are used to designate the configuration corresponding to each unit of FIG. 6, a description thereof will be omitted.

In FIG. 7, an input signal I+jQ and an input signal I'+jQ' are complex signals obtained by sampling in advance received signals of X polarization and Y polarization with a predetermined sampling frequency, respectively.

In the third embodiment, initially, the frequency offset estimation apparatus 15 coarsely estimates a frequency offset of the input signal I+jQ and the input signal I'+jQ' in a wideband, and outputs the estimated value to the frequency ambiguity elimination control unit 30.

Furthermore, the phase increment frequency offset estimation apparatus 20 estimates a frequency offset of signals output from the polarization demultiplexing unit 19, and outputs the estimated value to the frequency ambiguity elimination control unit 30.

Next, the frequency ambiguity elimination control unit 30 estimates a frequency offset based on the estimated frequency offsets input from the frequency offset estimation apparatus 15 and the phase increment frequency offset estimation apparatus 20, outputs to the NCO 21 of the second frequency offset compensation unit 29 to adjust an oscillation frequency of the NCO 21.

The frequency offset of the input signal I+jQ and the input signal I'+jQ' is compensated for in the frequency offset compensation unit 29, and then demodulation is performed using the first phase compensation unit 24, the second phase compensation unit 25, the first decision unit 26, and the second decision unit 27.

Here, a description will be provided for an operation of the frequency ambiguity elimination control unit 30 that eliminates the ambiguity of the estimated frequency offset of the phase increment frequency offset estimation apparatus 20 to estimate the frequency offset.

First, the frequency ambiguity elimination control unit 30 calculates frequencies of a plurality of frequency offset candidates, based on the estimated frequency offset input from the phase increment frequency offset estimation apparatus 20. Next, the frequency ambiguity elimination control unit 30 calculates the center of adjacent candidates in a frequency domain among the plurality of calculated frequency offset candidates, and sets the center as a boundary. Moreover, the frequency ambiguity elimination control unit 30 detects an area between adjacent boundaries of the frequency offset candidates in which the estimated frequency offset input from the frequency offset estimation apparatus 15 exists. Then, the frequency ambiguity elimination control unit 30 selects a frequency offset candidate in the detected area as an estimated frequency offset.

Next, the outline of the operation of estimating the frequency offset in the third embodiment will be described with reference to FIG. 8.

The frequency ambiguity elimination control unit 30 eliminates the ambiguity of the estimated frequency offset of the phase increment frequency offset estimation apparatus 20 based on the estimated value of the frequency offset estimation apparatus 15.

The ambiguity of the estimated frequency offset is caused by the ambiguity of the phase detected in the phase increment frequency offset estimation apparatus 20 using the phase increment algorithm, and it has periodicity. When the estimated frequency offset of the phase increment frequency offset estimation apparatus 20 is denoted as a frequency $f_{Mth}$, frequencies of frequency offset candidates, $f_{CND}(k)$, for which estimated values may be equal to the frequency $f_{Mth}$ are expressed by the following Formula 7.

[Expression 8]

$$f_{CND}(k) = f_{Mth} + k\frac{R_S}{M} (k = 0, \pm 1, \pm 2, \ldots)\quad \text{(formula 7)}$$

An actual frequency offset is denoted as a frequency $f_{CND}(L)$. That is, a coefficient k representing ambiguity is set as k=L (L is an integer). At this time, when the estimated frequency offset of the frequency offset estimation apparatus 15 is denoted as a frequency $f_{CO}$, the frequency offset estimation apparatus 15 is designed such that the frequency $f_{CO}$ satisfies the following Formula 8, so that it is possible to eliminate the ambiguity.

[Expression 9]

$$\frac{f_{CND}(L-1) + f_{CND}(L)}{2} < f_{CO} < \frac{f_{CND}(L) + f_{CND}(L+1)}{2}\quad \text{(formula 8)}$$

Figure 8:
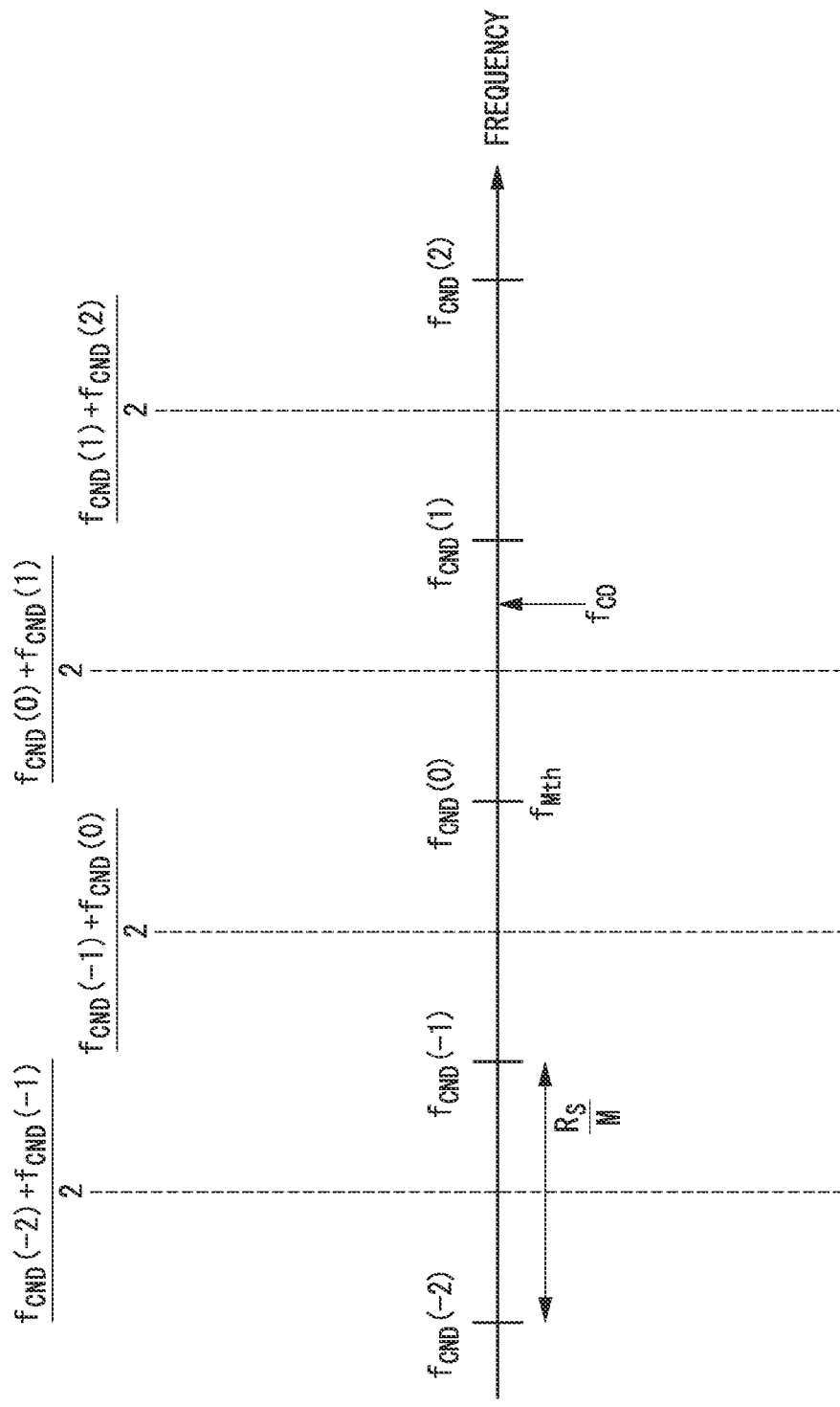
FIG. 8 is an explanatory diagram illustrating the outline of an operation of the third embodiment.

FIG. 8 illustrates that the frequencies $f_{CND}(k)$ are arranged in the frequency domain with a period of $R_S/M$ from the frequency $f_{Mth}$, and the center frequency of adjacent frequencies $f_{CND}(k)$ is set as a boundary of adjacent frequency offset candidates. In FIG. 8, since the frequency $f_{CO}$ exists in an area of the frequency $f_{CND}(1)$ of the frequency offset candidate, the frequency ambiguity elimination control unit 30 estimates an actual frequency offset as the frequency $f_{CND}(1)$.

In this way, in the reception apparatus provided with the frequency offset estimation apparatuses of the third embodiment, initially, the frequency offset estimation apparatus 15 coarsely estimates a frequency offset. Next, the frequency ambiguity elimination control unit 30 eliminates the ambiguity of a phase detected using the phase increment algorithm based on the estimated value, and estimates a frequency offset. Consequently, in the reception apparatus provided with the frequency offset estimation apparatuses of the third embodiment, it is possible to estimate and compensate for a frequency offset of received signals with high accuracy in a wideband, and to perform demodulation. Furthermore, as compared with the second embodiment, there is no NCO or multiplier for compensating for the frequency offset using the estimated value of the frequency offset estimation apparatus 15, resulting in a reduction of a circuit scale.

It is to be noted that, in FIG. 7 illustrating the configuration example of the third embodiment, the input signals input to the phase increment frequency offset estimation apparatus 20 are the output signals of the polarization demultiplexing unit 19; however, the input signals may be signals before being input to the polarization demultiplexing unit 19.

<Fourth Embodiment>

Hereinafter, a fourth embodiment of the present invention will be described with reference to the drawings.

Figure 9:
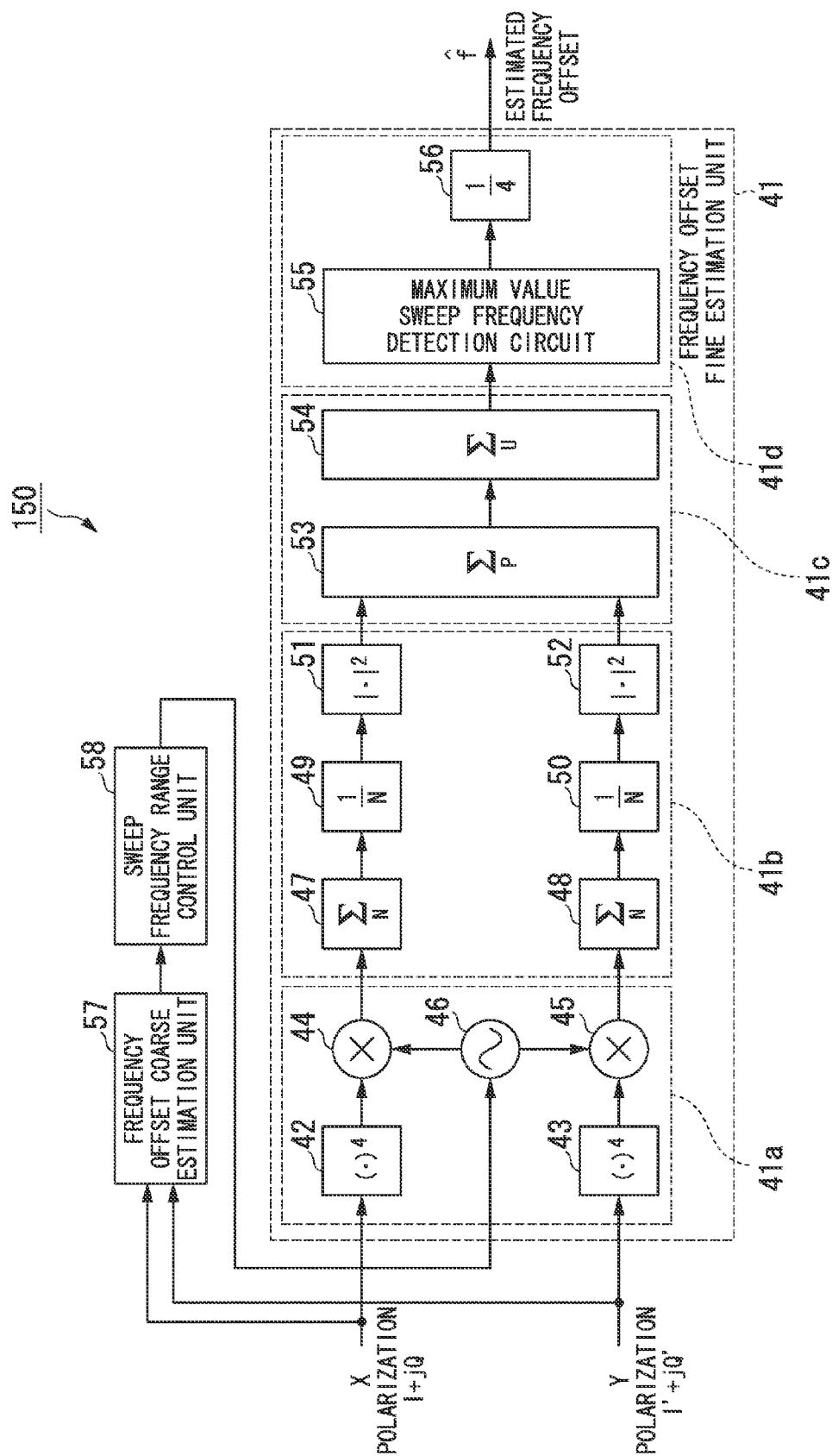
FIG. 9 is a block diagram illustrating a configuration example of a frequency offset estimation apparatus in accordance with a fourth embodiment.

FIG. 9 is a block diagram illustrating a configuration example of a frequency offset estimation apparatus 150 in accordance with the fourth embodiment of the present invention.

The frequency offset estimation apparatus includes a frequency offset fine estimation unit 41, a frequency offset coarse estimation unit 57, and a sweep frequency range control unit 58. Moreover, the frequency offset fine estimation unit 41 includes a first fourth-power circuit 42, a second fourth-power circuit 43, a first multiplication circuit 44, a second multiplication circuit 45, a numerically-controlled oscillator (NCO) 46, a first N symbol addition circuit 47, a second N symbol addition circuit 48, a first 1/N division circuit 49, a second 1/N division circuit 50, a first absolute value square circuit 51, a second absolute value square circuit 52, a polarization addition circuit 53, a U frame addition circuit 54, a maximum value sweep frequency detection circuit 55, and a ¼ division circuit 56.

The frequency offset coarse estimation unit 57 estimates a frequency offset from a frequency spectrum of a received signal including two polarizations sampled in advance with a predetermined sampling frequency. As the frequency offset coarse estimation unit 57, the frequency offset estimation apparatus 15 using the frequency spectrum described in the first embodiment may be used similarly to the second embodiment. Furthermore, instead of the frequency offset estimation apparatus 15 described in the first embodiment, the frequency offset estimation apparatus described in Non-Patent Document 3 may also be used in the same manner. The sweep frequency range control unit 58 determines a sweep frequency range based on a coarsely estimated value of the frequency offset coarse estimation unit 57. The frequency offset fine estimation unit 41 estimates a frequency offset of the received signal in the sweep frequency range determined by the sweep frequency range control unit 58. Here, rotational symmetry of constellation points on a constellation with no frequency offset of the received signal is denoted as $2\pi/W$. It is to be noted that W denotes a number (a positive integer) determined from a modulation scheme, W=4 in the case of QAM modulation, W=2 in the case of pulse amplitude modulation (PAM), and W=M in the case of M-PSK modulation. The fourth embodiment will be described with respect to the case of W=4.

The frequency offset fine estimation unit 41 includes a first operation unit 41a, a second operation unit 41b, a third operation unit 41c, and a fourth operation unit 41d. The first operation unit 41a raises each of the two polarizations in the received signal to the fourth power, and converts the frequency of the received signal by subtracting the sweep frequency from the frequency of the received signal. Then, the second operation unit 41b averages (calculation of an average value) N (N: a positive integer) symbols on the operation result of each polarization in the first operation unit 41a, and then performs a power operation of the absolute value (calculation of a power of the absolute value of the average value). Moreover, the third operation unit 41c sums the operation results of the two polarizations by the second operation unit 41b, and then adds U (U: a positive integer) frames each including the N symbols. Then, the fourth operation unit 41d detects a sweep frequency at which the operation result of the third operation unit 41c has a maximum value, multiplies the sweep frequency by ¼, and outputs the product, thereby estimating the frequency offset.

It is to be noted that the first operation unit 41a includes the first fourth-power circuit 42, the second fourth-power circuit 43, the first multiplication circuit 44, the second multiplication circuit 45, and the NCO 46. The second operation unit 41b includes the first N symbol addition circuit 47, the second N symbol addition circuit 48, the first 1/N division circuit 49, the second 1/N division circuit 50, the first absolute value square circuit 51, and the second absolute value square circuit 52. Furthermore, the third operation unit 41c includes the polarization addition circuit 53 and the U frame addition circuit 54. The fourth operation unit 41d includes the maximum value sweep frequency detection circuit 55 and the ¼ division circuit 56.

Hereinafter, an example of the specific operation of the frequency offset fine estimation unit 41 in the present embodiment will be described.

Formulas representing the operation of the fourth embodiment are Formula 9 and Formula 10.

[Expression 10]

$$\hat{f} = \frac{1}{4} \operatorname*{argmax}_{f} \sum_{u=1}^{U} \left( \sum_{p=1}^{2} \left| \frac{1}{N} \sum_{t=0}^{N-1} y^{A}(u, p, t) e^{-j2\pi ft} \right|^{2} \right) \quad \text{(formula 9)}$$

where $\hat{f}$: estimated frequency offset
arg max$_f$ g(x): operator for obtaining x that gives maximum value of function g(x)

[Expression 11]

$$4f_{coarse} - \frac{R_S}{2} \leq f \leq 4f_{coarse} + \frac{R_S}{2} \quad \text{(formula 10)}$$

Here, N denotes the number of symbols used in estimation of one frame, u denotes a frame number of a frame including N symbol sequences, U denotes the total number of frames used in estimation, and y(u, p, t) denotes a received signal and is a function of a frame u, polarization p, and a time t. Furthermore, $R_S$ denotes a symbol rate, and $f_{coarse}$ denotes a coarsely estimated frequency by the frequency offset coarse estimation unit 57.

In FIG. 9, an input signal I+jQ and an input signal I'+jQ' are complex signals of X polarization and Y polarization, which have been obtained by sampling in advance the received signal y(u, p, t) of Formula 9 with a predetermined sampling frequency, respectively. In the frequency offset fine estimation unit 41, the input signals are raised to the fourth power in the first fourth-power circuit 42 and the second fourth-power circuit 43, and are multiplied by an output signal exp(−j2πft) of the NCO 46 in the first multiplication circuit 44 and the second multiplication circuit 45. This multiplication corresponds to an operation for performing frequency conversion by subtracting the frequency f from the frequency of the received signal raised to the fourth power.

The sweep frequency of the NCO 46 is controlled by the sweep frequency range control unit 58. Specifically, the sweep frequency range control unit 58 determines the frequency range of the sweep frequency of the NCO 46 from the coarsely estimated frequency $f_{coarse}$ estimated by the frequency offset coarse estimation unit 57 and the symbol rate $R_S$ such that Formula 10 is satisfied, and changes the frequency f in predetermined steps from a lower limit frequency to an upper limit frequency of Formula 10. In the frequency offset fine estimation unit 41, in each frequency f, the first N symbol addition circuit 47 and the second N symbol addition circuit 48 add operation results for N symbols, the first 1/N division circuit 49 and the second 1/N division circuit 50 divide the sums by N to obtain the averages of N values, the first absolute value square circuit 51 and the second absolute value square circuit 52 obtain the squares of the absolute values, and the polarization addition circuit 53 adds operation results for the two polarizations. Here, the frequency offset fine estimation unit 41 treats the N symbol sequences and subsequent N symbol sequences as a first frame and a second frame, respectively, and the U frame addition circuit 54 adds operation results of the U frames. As a result of this addition process, the frequency offset fine estimation unit 41 eliminates noise components. By the operations up to now, an evaluation function $\phi_n(f)$ expressed by the following Formula 11 is obtained.

[Expression 12]

$$\varphi_n(f) = \sum_{u=1}^{U} \left( \sum_{p=1}^{2} \left| \frac{1}{N} \sum_{t=0}^{N-1} y^4(u, p, t) e^{-j2\pi ft} \right|^2 \right) \quad \text{(formula 11)}$$

In the frequency offset estimation apparatus 150, the maximum value sweep frequency detection circuit 55 calculates a frequency f at which the evaluation function $\phi_n(f)$ has a maximum value, and the ¼ division circuit 56 multiples the frequency f by ¼, so that it is possible to estimate a frequency offset.

In the fourth embodiment, the frequency offset coarse estimation unit 57 and the sweep frequency range control unit 58 control the sweep frequency range of the NCO 46, so that it is possible to expand the estimation range of the frequency offset to a wideband. This point will be described with reference to FIG. 23.

Figure 23:
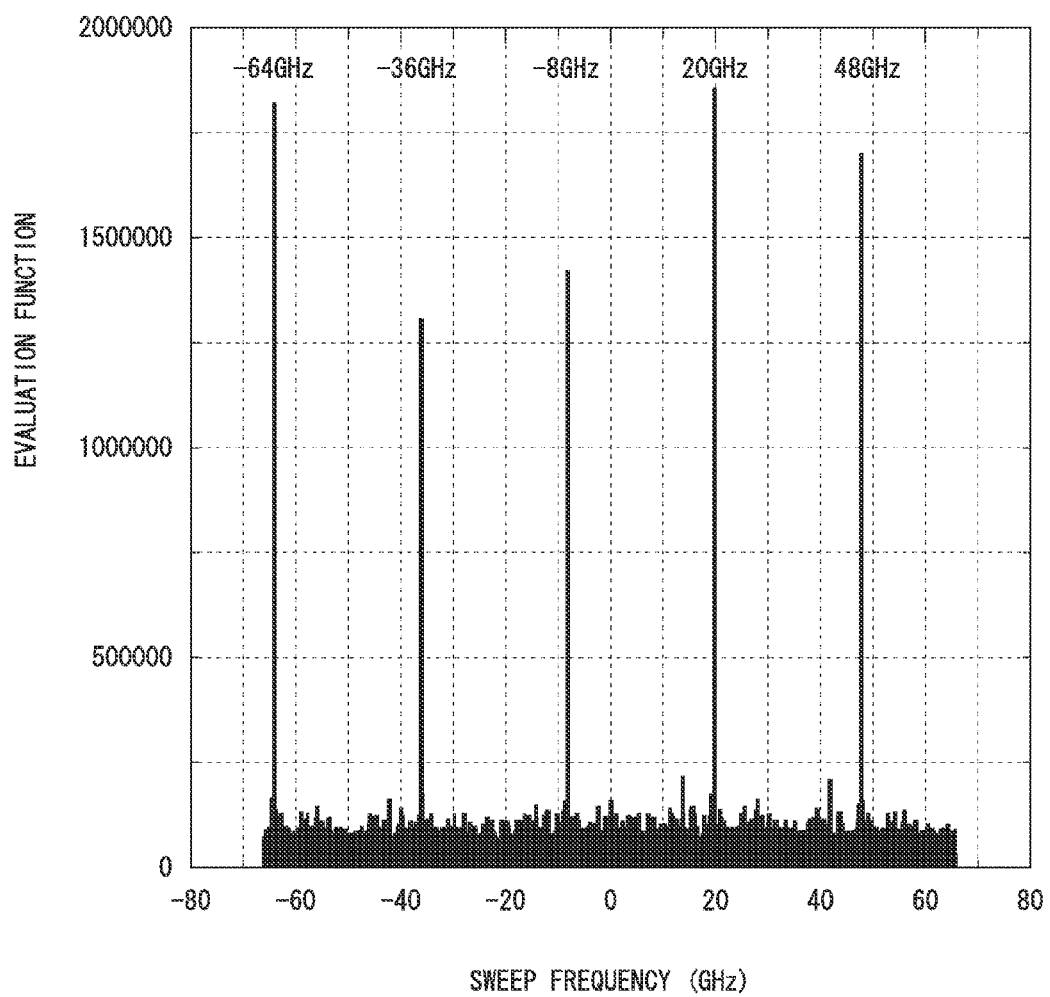
FIG. 23 is a first explanatory diagram illustrating an example of a simulation result for describing a conventional problem.

For example, in FIG. 23, in which a frequency offset is 5 GHz, when the coarsely estimated frequency $f_{coarse}$ is 4 GHz, since the symbol rate $R_S$ is 28 GHz, the sweep frequency range of the NCO 46 is [2 GHz to 30 GHz] by Formula 10. Consequently, the frequency offset estimation apparatus 150 detects only a peak of 20 GHz and does not detect both adjacent peaks of the peak, and thus it is possible to detect 20 GHz as a maximum value sweep frequency without ambiguity and to output 5 GHz, which is ¼ of 20 GHz, as an estimated frequency offset.

Since an estimable frequency range is [$f_{coarse}-R_S/8$ to $f_{coarse}+R_S/8$] and the coarsely estimated frequency $f_{coarse}$ is variable, it is possible for the frequency offset estimation apparatus 150 of the present embodiment to perform estimation in a wideband. Furthermore, in the present embodiment, since a large value of $\pm R_S/8$ is permissible as an error between a true frequency offset value and the coarsely estimated frequency $f_{coarse}$, highly accurate performance is not required in the frequency offset coarse estimation unit 57. It is to be noted that, in the conventional art, since an estimation range is [−14 GHz to 14 GHz], −8 GHz is detected as a maximum value sweep frequency and −2 GHz, which is ¼ of −8 GHz, is output as an estimated frequency offset.

Figure 10:
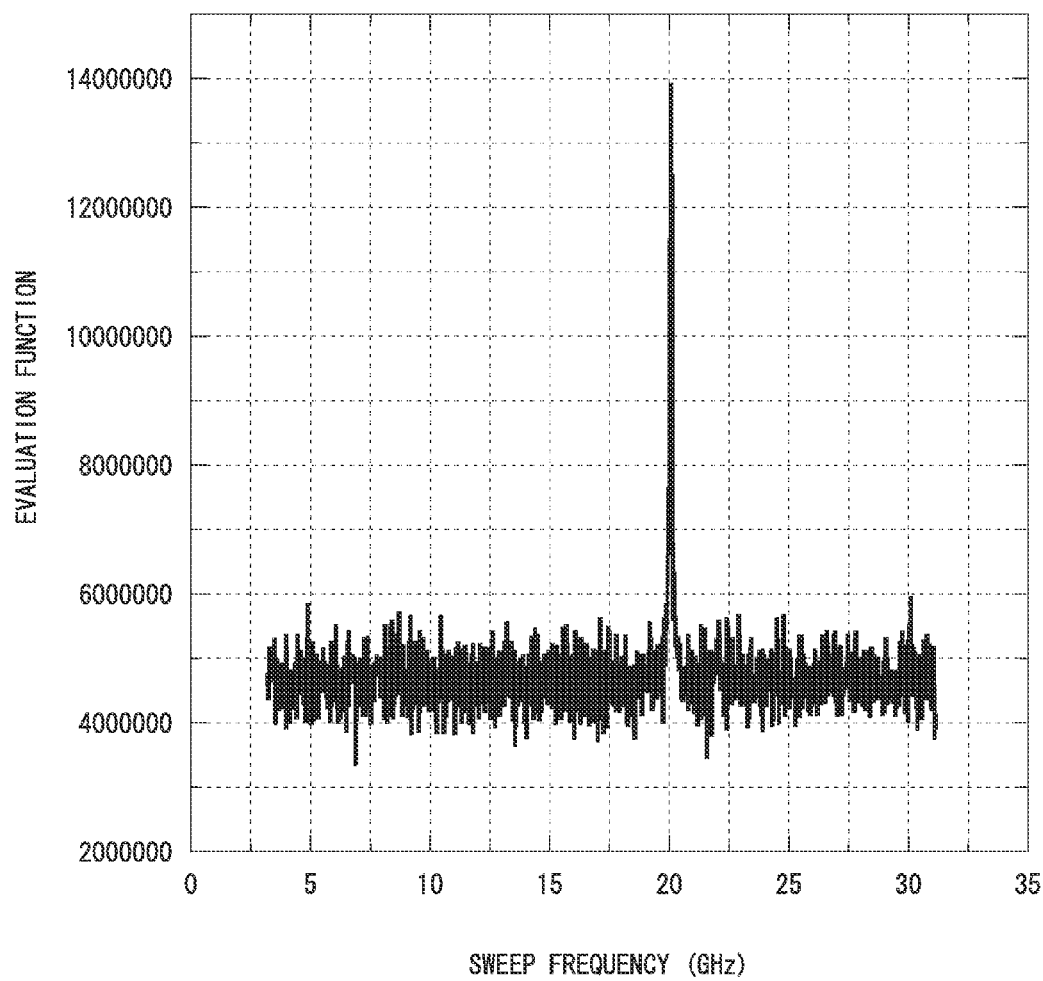
FIG. 10 is an explanatory diagram illustrating an example of the result obtained by simulating the operation of the frequency offset estimation apparatus in accordance with the fourth embodiment.
Figure 24:
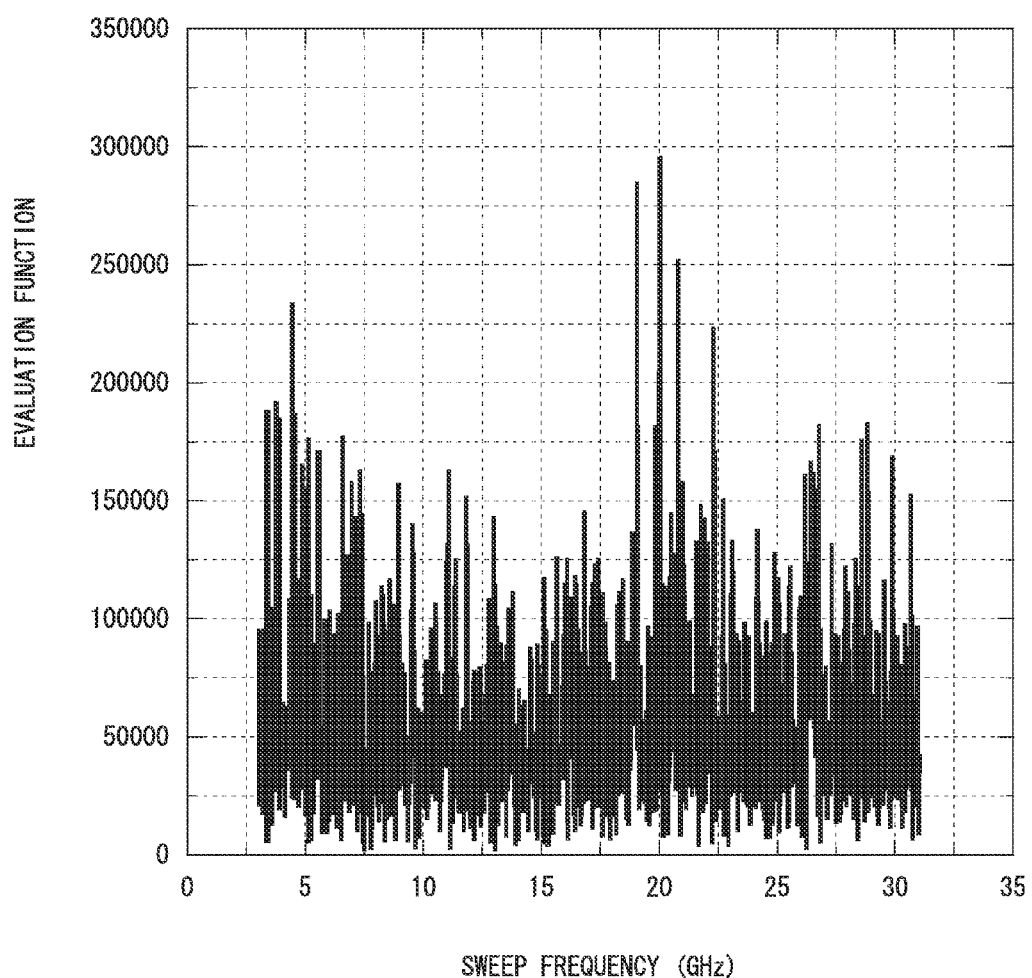
FIG. 24 is a second explanatory diagram illustrating the example of the simulation result for describing the conventional problem.
Figure 25:
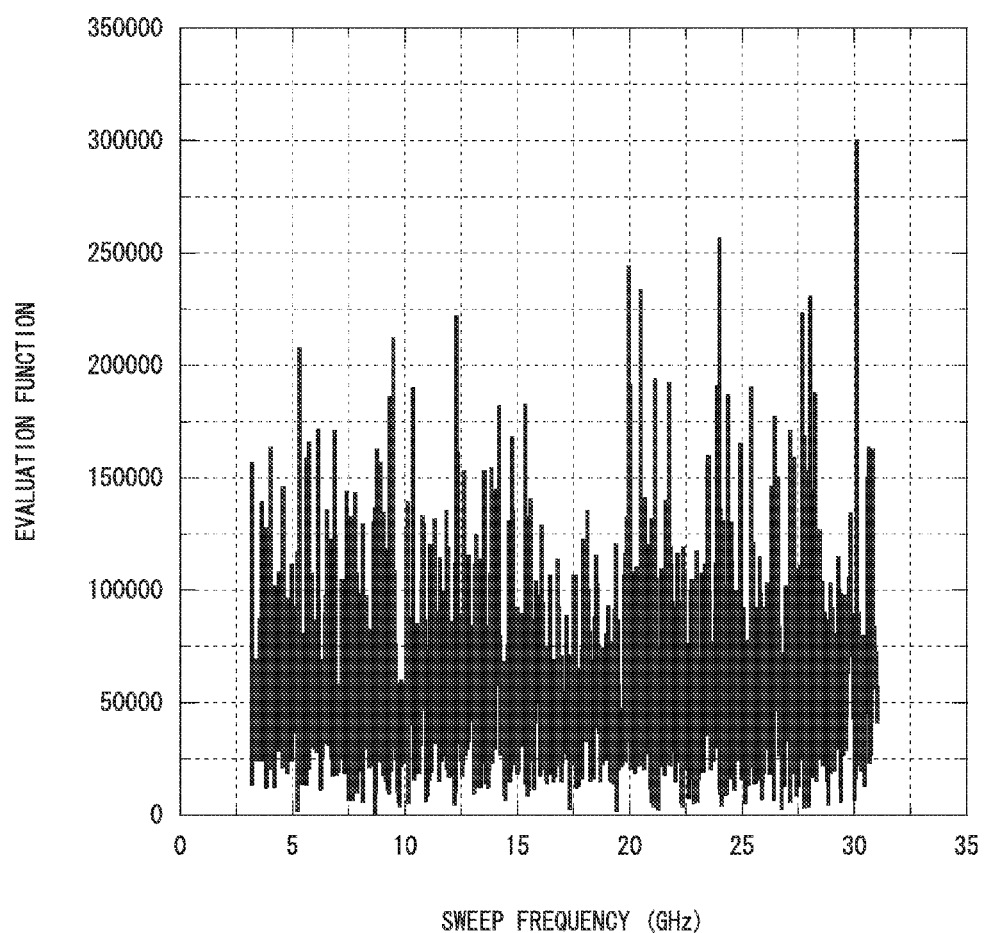
FIG. 25 is a third explanatory diagram illustrating the example of the simulation result for describing the conventional problem.

FIG. 10 illustrates the obtained result of the evaluation function $\phi_n(f)$ of Formula 11 when a simulation has been performed under the assumption that a frequency offset is 5 GHz, the linewidth of a laser is 10 MHz, and OSNR is 10 dB similarly to FIG. 24 and FIG. 25, and that the number of symbols, N, to be used in estimation of one frame is 1028 and the total number of frames, U, to be used in estimation is 80.

Comparing FIG. 10 with FIG. 24 and FIG. 25, a peak of 20 GHz, which is four times the frequency offset, is emphasized, and local peaks having temporarily appeared in each frame is relatively reduced. Consequently, it is possible for the frequency offset estimation apparatus 150 to correctly calculate an estimation result without being affected by the local peaks having temporarily appeared in each frame due to phase noise and/or thermal noise.

As described above, in the frequency offset estimation apparatus 150 of the fourth embodiment, the sweep frequency range control unit 58 determines the frequency range of the sweep frequency of the NCO 46 based on the result coarsely estimated by the frequency offset coarse estimation unit 57, and estimates the frequency offset such that the frequency ambiguity when the frequency offset fine estimation unit 41 estimates the frequency offset is eliminated. Furthermore, the frequency offset estimation apparatus 150 eliminates noise components of the received signal in the operation process in which the frequency offset fine estimation unit 41 estimates the frequency offset. Consequently, it is possible for the frequency offset estimation apparatus 150 of the fourth embodiment to estimate the frequency offset of the received signal with high accuracy in a wideband.

<Fifth Embodiment>

Hereinafter, a fifth embodiment of the present invention will be described with reference to the drawings.

Figure 11:
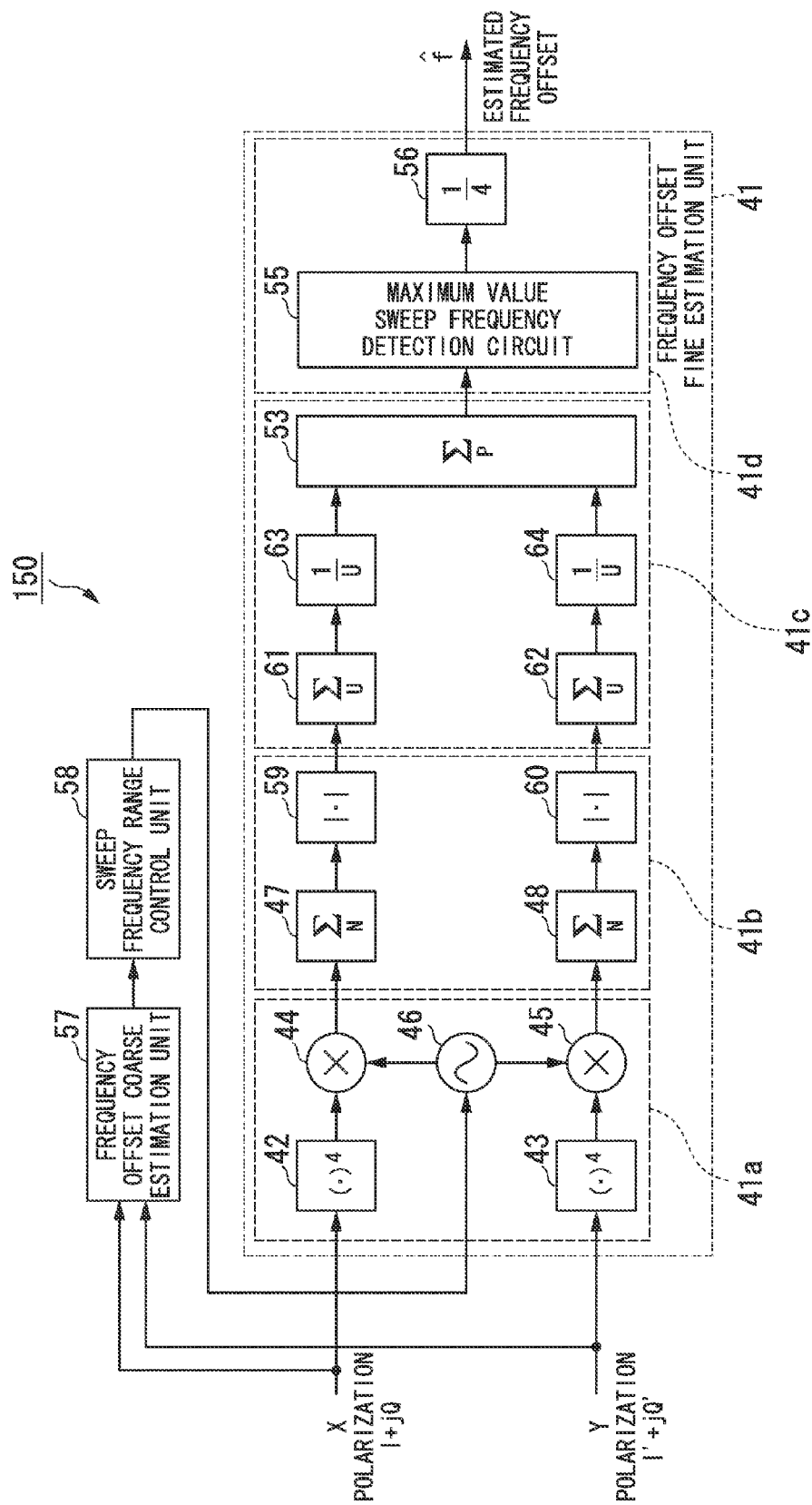
FIG. 11 is a block diagram illustrating a configuration example of a frequency offset estimation apparatus in accordance with a fifth embodiment.

FIG. 11 is a block diagram illustrating a configuration example of a frequency offset estimation apparatus 150 in accordance with the fifth embodiment. It is to be noted that, in FIG. 11, since the same reference symbols are used to designate the configuration corresponding to each unit of FIG. 9, a description thereof will be omitted.

It is to be noted that, in a frequency offset fine estimation unit 41 in accordance with the fifth embodiment, a first operation unit 41a and a fourth operation unit 41d have the same configurations as the first operation unit 41a and the fourth operation unit 41d in accordance with the fourth embodiment. In contrast, in the frequency offset fine estimation unit 41 in accordance with the fifth embodiment, a second operation unit 41b and a third operation unit 41c have configurations different from those of the second operation unit 41b and the third operation unit 41c in accordance with the fourth embodiment. In the frequency offset fine estimation unit 41 in accordance with the fifth embodiment, the second operation unit 41b includes a first N symbol addition circuit 47, a second N symbol addition circuit 48, a first absolute value circuit 59, and a second absolute value circuit 60. Furthermore, the third operation unit 41c includes a first U frame addition circuit 61, a second U frame addition circuit 62, a first 1/U division circuit 63, a second 1/U division circuit 64, and a polarization addition circuit 53.

In the frequency offset fine estimation unit 41 of the present embodiment, the second operation unit 41b adds operation results of N symbols of each polarization in the first operation unit 41a, and then performs an operation of an absolute value (calculation of the absolute value of the added value). Moreover, in the frequency offset fine estimation unit 41, the third operation unit 41c averages U frames, each frame including the N symbols, on an operation result obtained in the second operation unit 41b, and then adds operation results of two polarizations. Then, in the frequency offset fine estimation unit 41, the fourth operation unit 41d detects a sweep frequency at which the operation result of the third operation unit 41c has a maximum value, multiplies the sweep frequency by ¼, and outputs the product, thereby estimating the frequency offset.

As compared with the configuration of the fourth embodiment illustrated in FIG. 9, the frequency offset fine estimation unit 41 of the present embodiment does not have the first 1/N division circuit 49 and the second 1/N division circuit 50. In this way, since the first 1/N division circuit 49 and the second 1/N division circuit 50 are omitted, each frequency component of an evaluation function $\phi_n(f)$ is increased N times, but there is no change in a relative magnitude relation between frequencies. Thus, the frequency offset fine estimation unit 41 of the present embodiment estimates a frequency offset similarly to the frequency offset fine estimation unit 41 of the fourth embodiment. Here, a process by both the N symbol addition circuit and the 1/N division circuit is an averaging process, and a process by the N symbol addition circuit without the 1/N division circuit is an addition process.

Furthermore, the first absolute value square circuit 51 and the second absolute value square circuit 52 in the frequency offset fine estimation unit 41 of the fourth embodiment are replaced with the first absolute value circuit 59 and the second absolute value circuit 60 in the frequency offset fine estimation unit 41 of the present embodiment. Even when a power of one or another power is used instead of a square in this way, there is no change in a relative magnitude relation between frequency components of the evaluation function $\phi_n(f)$. Thus, the frequency offset fine estimation unit 41 of the present embodiment estimates a frequency offset similarly to the frequency offset fine estimation unit 41 of the fourth embodiment.

Furthermore, as compared with the configuration of the frequency offset fine estimation unit 41 of the fourth embodiment, the frequency offset fine estimation unit 41 of the present embodiment is provided with the first 1/U division circuit 63 and the second 1/U division circuit 64. Thus, each frequency component of the evaluation function $\phi_n(f)$ is multiplied by 1/U, but there is no change in the relative magnitude relation between frequencies. Thus, the frequency offset fine estimation unit 41 of the present embodiment estimates a frequency offset similarly to the frequency offset fine estimation unit 41 of the fourth embodiment. Here, a process by both the U frame addition circuit and the 1/U division circuit is an averaging process, and a process by the U frame addition circuit without the 1/U division circuit is an addition process.

Moreover, the order of the polarization addition circuit 53 and the U frame addition circuit 54 in the frequency offset fine estimation unit 41 of the fourth embodiment has been changed to the order of the first U frame addition circuit 61 (or the second U frame addition circuit 62), the 1/U division circuit, and the polarization addition circuit 53 in the frequency offset fine estimation unit 41 of the present embodiment. In this way, even when the order of addition of frames and the order of addition of polarizations are exchanged, there is no change in the relative magnitude relation between the frequency components of the evaluation function $\phi_n(f)$. Thus, the frequency offset fine estimation unit 41 of the present embodiment estimates a frequency offset similarly to the frequency offset fine estimation unit 41 of the fourth embodiment. It is to be noted that, when the total number U of frames used in estimation is increased, it is also possible to select only an evaluation function of polarization with a larger peak value without adding the polarizations.

Consequently, even in the configuration of the aforementioned frequency offset fine estimation unit 41, similarly to the configuration of the frequency offset fine estimation unit 41 in the frequency offset estimation apparatus 150 of the fourth embodiment, it is possible for the frequency offset estimation apparatus 150 of the fifth embodiment to estimate the frequency offset of the received signal with high accuracy in a wideband.

Furthermore, the fourth embodiment and the fifth embodiment are not limited to a signal modulated with QAM, and, for example, a PSK modulation scheme, a modulation scheme in which the amplitude of PSK has multiple levels, or a PAM modulation scheme can be applied thereto. In these cases, when rotational symmetry of constellation points on a constellation with no frequency offset is denoted as $2\pi/W$, it is sufficient if the first fourth-power circuit 42 and the second fourth-power circuit 43 are replaced with $W^{th}$ power circuits, and the ¼ division circuit 56 is replaced with a 1/W division circuit. For example, W is 2 in the case of PAM modulation and W is 8 in the case of 8 PSK modulation.

<Sixth Embodiment>

Hereinafter, a sixth embodiment of the present invention will be described with reference to the drawings.

Figure 12:
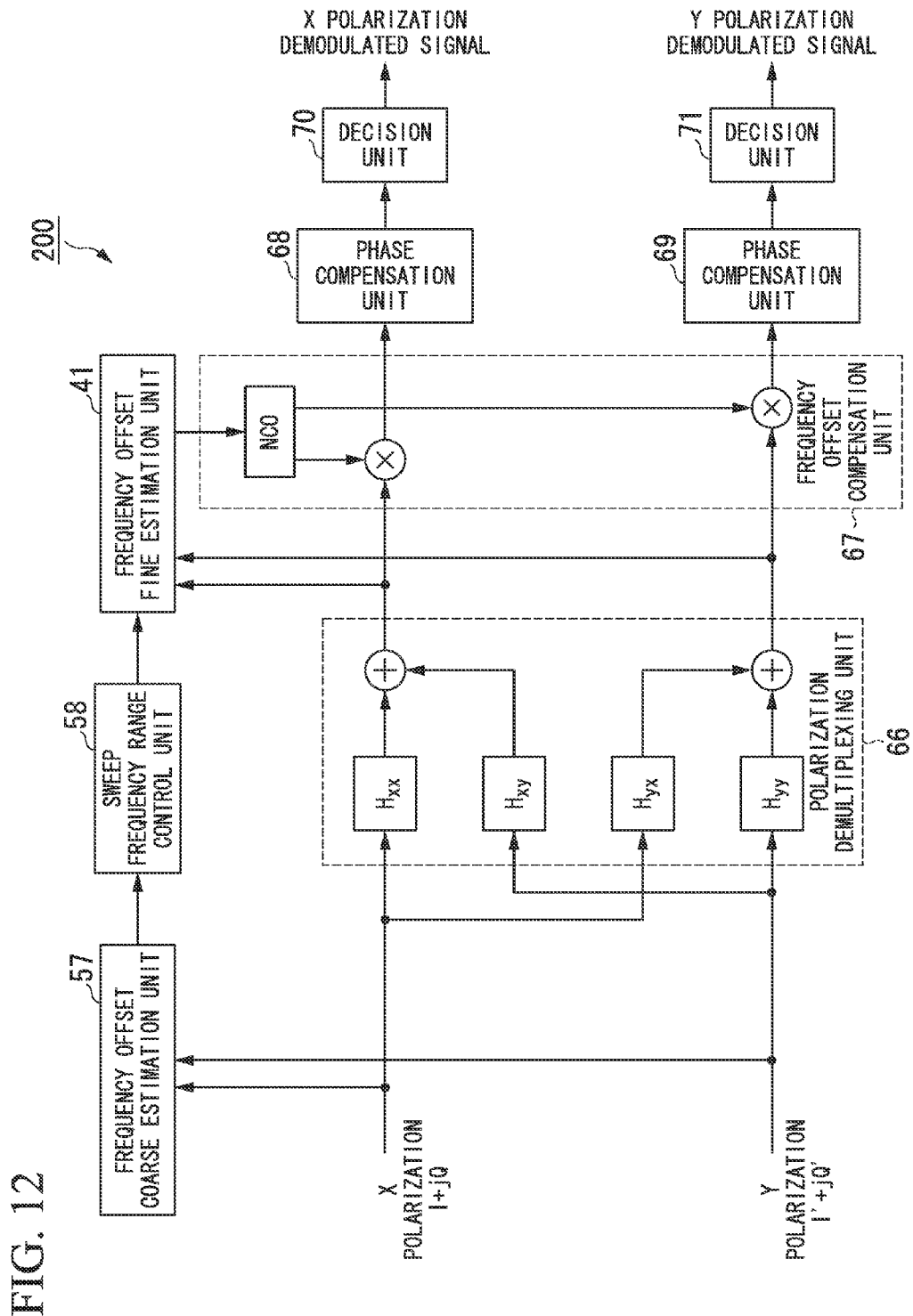
FIG. 12 is a block diagram illustrating a configuration example of a reception apparatus in accordance with a sixth embodiment.

FIG. 12 is a block diagram illustrating a configuration example of a reception apparatus 200 in accordance with the sixth embodiment of the present invention.

The reception apparatus 200 includes a frequency offset fine estimation unit 41, a frequency offset coarse estimation unit 57, a sweep frequency range control unit 58, a polarization demultiplexing unit 66, a frequency offset compensation unit 67, a first phase compensation unit 68, a second phase compensation unit 69, a first decision unit 70, and a second decision unit 71. Here, the frequency offset fine estimation unit 41, the frequency offset coarse estimation unit 57, and the sweep frequency range control unit 58 which are illustrated in FIG. 12 correspond to the respective units with the same reference symbols illustrated in FIG. 9 and FIG. 11.

The frequency offset compensation unit 67 compensates for a frequency offset of a received signal based on the value of a frequency offset of the received signal estimated by the frequency offset estimation apparatus 150. The first phase compensation unit 68 and the second phase compensation unit 69 compensate for the phase of the received signal compensated by the frequency offset compensation unit 67. The first decision unit 70 and the second decision unit 71 perform symbol decision of the received signal with the compensated phase.

In the reception apparatus 200 of the sixth embodiment, initially, the sweep frequency range control unit 58 determines a sweep frequency of the frequency offset fine estimation unit 41 based on a frequency offset value coarsely estimated by the frequency offset coarse estimation unit 57 such that Formula 10 is satisfied.

The polarization demultiplexing unit 66 performs polarization demultiplexing and residual dispersion elimination on an input signal I+jQ and an input signal I'+jQ'. The frequency offset fine estimation unit 41 receives signals output from the polarization demultiplexing unit 66, and estimates a frequency offset.

The estimated frequency offset estimated by the frequency offset fine estimation unit 41 is input to the frequency offset compensation unit 67, in which the frequency offset of the input signal I+jQ and the input signal I'+jQ' are compensated for. Next, the first phase compensation unit 68 and the second phase compensation unit 69 compensate for the phase of the signals with the frequency offset compensated for by the frequency offset compensation unit 67, and output to the first decision unit 70 and the second decision unit 71, respectively. The first decision unit 70 and the second decision unit 71 perform symbol decision to generate demodulated signals.

As described above, the polarization demultiplexing and the residual dispersion elimination are also performed together with the estimation of the frequency offset, so that it is possible to operate the frequency offset fine estimation unit 41 on an input signal with a small frequency offset and a small dispersion value. Consequently, in the reception apparatus 200 which is provided with the frequency offset estimation apparatus 150 of the sixth embodiment, it is possible to estimate and compensate for a frequency offset of a received signal with high accuracy in a wideband, and to perform demodulation.

It is to be noted that the signals input to the frequency offset fine estimation unit 41 may be the signals before being input to the polarization demultiplexing unit 66, instead of the output signals of the polarization demultiplexing unit 66. However, when the signals subjected to the polarization demultiplexing and the residual dispersion elimination in the polarization demultiplexing unit 66 are input to the frequency offset fine estimation unit 41, it is possible to estimate a frequency offset with higher accuracy.

<Seventh Embodiment>

Hereinafter, a seventh embodiment of the present invention will be described with reference to the drawings.

Figure 13:
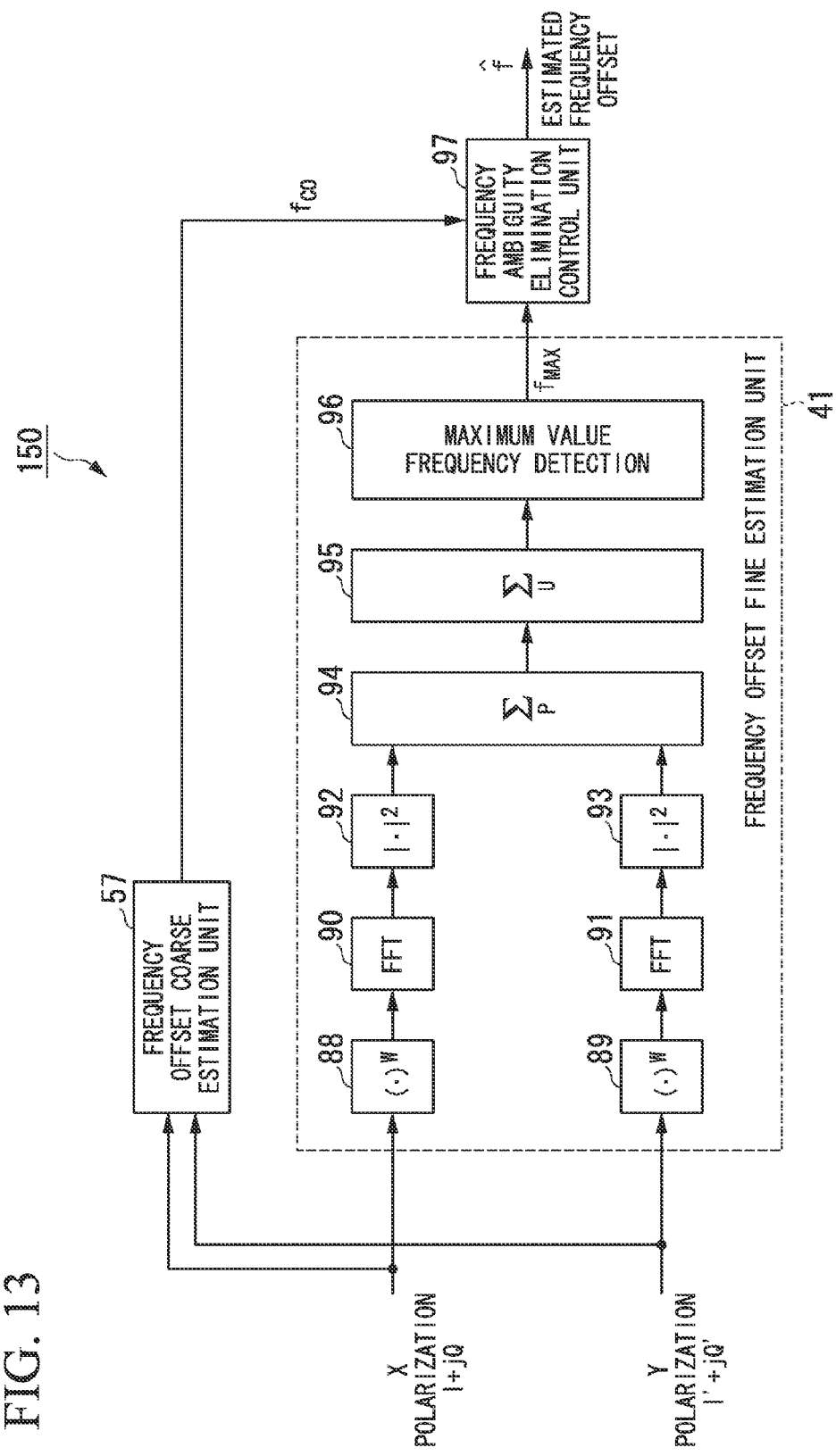
FIG. 13 is a block diagram illustrating a configuration example of a frequency offset estimation apparatus in accordance with a seventh embodiment.

FIG. 13 is a block diagram illustrating a configuration example of a frequency offset estimation apparatus 150 in accordance with the seventh embodiment of the present invention.

The frequency offset estimation apparatus 150 includes a frequency offset coarse estimation unit 57, a frequency offset fine estimation unit 41, and a frequency ambiguity elimination control unit 97. The frequency offset fine estimation unit 41 includes a first $W^{th}$-power circuit 88, a second $W^{th}$-power circuit 89, a first FFT unit 90, a second FFT unit 91, a first absolute value square circuit 92, a second absolute value square circuit 93, a polarization spectrum addition circuit 94, a U frame spectrum addition circuit 95, and a maximum value frequency detection circuit 96. It is to be noted that W is a number (a positive integer) determined from a modulation scheme, and rotational symmetry of constellation points on a constellation with no frequency offset is denoted as $2\pi/W$. W is 4 in the case of QAM modulation, W is 2 in the case of PAM modulation, and W is M in the case of M-PSK modulation.

As the frequency offset coarse estimation unit 57, the frequency offset estimation apparatus 15 using the frequency spectrum described in the first embodiment can be used. Furthermore, instead of the frequency offset estimation apparatus 15 described in the first embodiment, the invention disclosed in Non-Patent Document 3 may be used in the same manner. The present embodiment has a configuration focused on the fact that an evaluation function that is a time average is equivalent to discrete Fourier transform.

When the rotational symmetry of the constellation points on the constellation with no frequency offset of the received signal is defined as $2\pi/W$, the frequency offset fine estimation unit 41 of the present embodiment raises two polarizations in the received signal to the $W^{th}$ power and then converts the resultant signals into frequency spectrums. Then, the frequency offset fine estimation unit 41 calculates the absolute value or a power of the absolute value of the converted results, sums the frequency spectrums of the two polarizations, adds or averages the frequency spectrums of U (U: a positive integer) frames each including N (N: a positive integer) symbols, and detects a frequency at which this operation result has a maximum value.

First, in the frequency offset fine estimation unit 41, the first $W^{th}$-power circuit 88 and the second $W^{th}$-power circuit 89 raise an input signal I+jQ and an input signal I'+jQ' to the $W^{th}$ power, and the first FFT unit 90 and the second FFT unit 91 simultaneously convert N symbol sequences into frequency spectrums. Next, in the frequency offset fine estimation unit 41, the first absolute value square circuit 92 and the second absolute value square circuit 93 obtain the square of the absolute value of data of the frequency spectrums, and the polarization spectrum addition circuit 94 sums the frequency spectrums of two polarizations. Here, the frequency offset fine estimation unit 41 treats the N symbol sequences and subsequent N symbol sequences as a first frame and a second frame, respectively, and the U frame spectrum addition circuit 95 adds the frequency spectrums of U frames. By this addition process, the frequency offset fine estimation unit 41 eliminates noise components.

The maximum value frequency detection circuit 96 calculates a frequency f having a maximum value from the added frequency spectrum. In the fourth embodiment and the fifth embodiment, an evaluation function $\phi_n(f)$ is obtained in each frequency while the sweep frequency of the NCO 46 is changed in predetermined steps, and then an frequency f at which $\phi_n(f)$ is maximized is detected. In contrast, in the seventh embodiment, the frequency spectrum is obtained, and the frequency f at which the frequency spectrum is maximized in a frequency domain is detected.

Furthermore, in the fourth embodiment and the fifth embodiment, in order to estimate a frequency offset with no frequency ambiguity, the sweep frequency range control unit 58 limits in advance the frequency range of the sweep frequency of the NCO 46. In contrast, the frequency spectrum used in the seventh embodiment has frequency ambiguity. The frequency ambiguity is eliminated by the frequency ambiguity elimination control unit 97. The frequency ambiguity elimination control unit 97 eliminates the frequency ambiguity of the frequency offset estimated by the frequency offset fine estimation unit 41, based on the frequency offset value estimated by the frequency offset coarse estimation unit 57, thereby estimating the frequency offset.

When eliminating the frequency ambiguity and estimating the frequency offset, the frequency ambiguity elimination control unit 97 calculates candidate frequencies of the frequency offset including the frequency ambiguity based on the frequency offset estimated by the frequency offset fine estimation unit 41. Moreover, the frequency ambiguity elimination control unit 97 sets the center of frequencies of adjacent frequency offset candidates in a frequency domain as a boundary between the adjacent frequency offset candidates, and selects an area including the value estimated by the frequency offset coarse estimation unit 57 from areas based on boundaries in the frequency domain. Then, the frequency ambiguity elimination control unit 97 selects the frequency of a frequency offset candidate included in the selected area as an estimated frequency offset.

Figure 14:
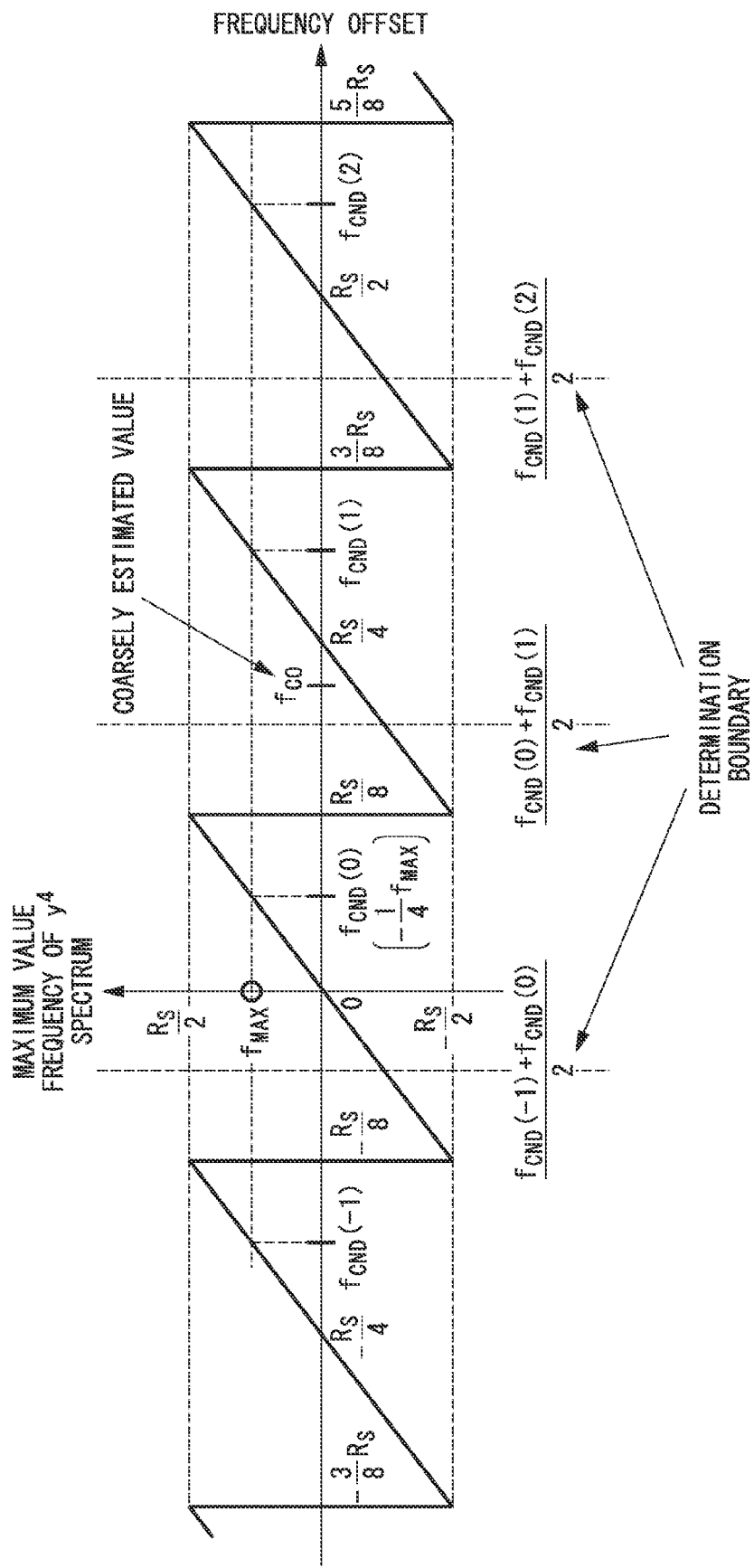
FIG. 14 is an explanatory diagram illustrating the outline of a frequency offset estimation operation of the frequency offset estimation apparatus in accordance with the seventh embodiment.

Hereinafter, a specific example of the operation of the present embodiment, in which the frequency ambiguity is eliminated and the frequency offset is estimated, will be described with reference to FIG. 14 and Formula 12 to Formula 16. FIG. 14 is an explanatory diagram illustrating the outline of the frequency offset estimation operation of the frequency offset estimation apparatus 150 in accordance with the seventh embodiment.

[Expression 13]

$$f_{MAX} = \underset{f}{\mathrm{argmax}} \sum_{u=1}^{U} \left( \sum_{p=1}^{2} \left| \frac{1}{N} \sum_{t=0}^{N-1} y^W(u, p, t) e^{-j2\pi ft} \right|^2 \right) \quad \text{(formula 12)}$$

[Expression 14]

$$-\frac{R_S}{2} \le f \le \frac{R_S}{2} \quad \text{(formula 13)}$$

[Expression 15]

$$f_{CND}(k) = \frac{1}{W} f_{MAX} + k \frac{R_S}{M}, (k = 0, \pm 1, \pm 2, \dots) \quad \text{(formula 14)}$$

[Expression 16]

$$\frac{f_{CND}(i-1) + f_{CND}(i)}{2} < f_{CO} < \frac{f_{CND}(i) + f_{CND}(i+1)}{2} \quad \text{(formula 15)}$$

[Expression 17]

$$\hat{f} = \frac{1}{W} f_{MAX} + i \frac{R_S}{W} \quad \text{(formula 16)}$$

In Formula 12, the interior of an absolute value symbol corresponds to discrete Fourier transform regarding $y^W$(u, p, t). That is, it is a frequency spectrum regarding $y^W(u, p, t)$. A frequency range for obtaining the maximum value of the frequency spectrum is limited by Formula 13 to $[-R_S/2$ to $R_S/2]$, which is the first Nyquist zone not affected by the influence of folding. When a frequency at which the frequency spectrum of a $W^{th}$ power of a received signal is maximized is denoted as $f_{MAX}$, Formula 14 gives a frequency of a frequency offset candidate, $f_{CND}(k)$, at which an estimated frequency offset may be $f_{MAX}$. FIG. 14 illustrates the case in which W is 4. In FIG. 14, $f_{MAX}$ and $f_{CND}(k)$ have been plotted on a vertical axis and a horizontal axis, respectively.

A coarsely estimated value of the frequency offset coarse estimation unit 97 is denoted as $f_{CO}$, and the center of adjacent $f_{CND}(k)$ is denoted as a determination boundary. At this time, among areas each interposed between two determination boundaries, an area including $f_{CO}$ provides an actual frequency offset. Formula 15 indicates that an area of k=i includes $f_{CO}$, and it is possible to determine an estimated frequency offset by Formula 16. In this case, in the example illustrated in FIG. 14, the following Formula 17 is satisfied.
[Expression 18]

$$\hat{f} = f_{CND}(1) \qquad \text{(formula 17)}$$

As described above, the frequency offset estimation apparatus 150 of the seventh embodiment eliminates the frequency ambiguity of the frequency offset estimated by the frequency offset fine estimation unit 41 based on the frequency offset value estimated by the frequency offset coarse estimation unit 57, thereby estimating the frequency offset. Consequently, it is possible for the frequency offset estimation apparatus 150 of the seventh embodiment to estimate the frequency offset of the received signal with high accuracy in a wideband. Furthermore, as compared with the fourth embodiment and the fifth embodiment, the sweep frequency range control unit 58 and the NCO 46 are replaced with the FFT units 90 and 91, and the estimation is performed after simultaneous conversion into the frequency spectrums, so that it is possible to shorten the time required for the estimation.

It is to be noted that the FFT unit 90 and the FFT unit 91 performing conversion into the frequency spectrums may use short-time Fourier transform, discrete Fourier transform, wavelet transform, or other frequency analysis methods as a frequency analysis method as well as the fast Fourier transform. Furthermore, even when a power of one or another power is used in the first absolute value square circuit 92 and the second absolute value square circuit 93 instead of a square, there is no change in a relative magnitude relation between frequency components of the frequency spectrum, and thus the operation is not affected. Furthermore, the polarization spectrum addition circuit 94 may select a frequency spectrum of polarization with a larger peak value without adding the polarizations.

Figure 15:
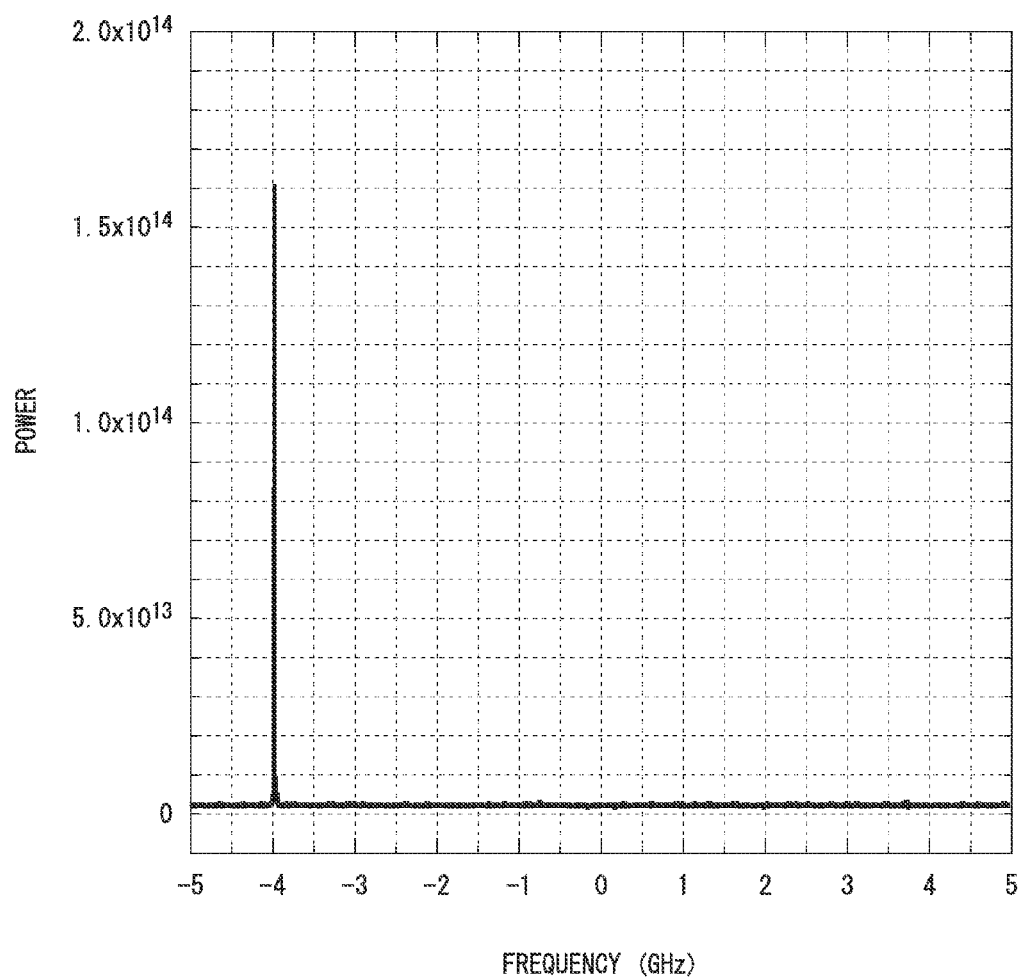
FIG. 15 is an explanatory diagram illustrating an example of an experimental result in accordance with the seventh embodiment.

FIG. 15 is an explanatory diagram illustrating an example of the experimental result of the seventh embodiment.

The experimental result shows a frequency spectrum of the output signal of the U frame spectrum addition circuit 95 when receiving a signal modulated with 64 QAM having a symbol rate $R_S$ of 10 GHz. Furthermore, the estimated value $f_{CO}$ of the frequency offset coarse estimation unit 57 was 3.7 GHz. Referring to FIG. 15, $f_{MAX}$ of Formula 12 is −4 GHz. From Formula 14 and W=4, $f_{CND}(k)$ is −1 GHz (k=0), 1.5 GHz (k=1), 4 GHz (k=2), 6.5 GHz (k=3) and the like, and, among them, i satisfying Formula 15 is 2. Accordingly, from Formula 16, a frequency offset can be determined as 4 GHz.

In accordance with the present embodiment as described above, it is possible to estimate a frequency offset exceeding $R_S/8$ (=1.25 GHz).

<Eighth Embodiment>

Hereinafter, an eighth embodiment of the present invention will be described with reference to the drawings.

Figure 16:
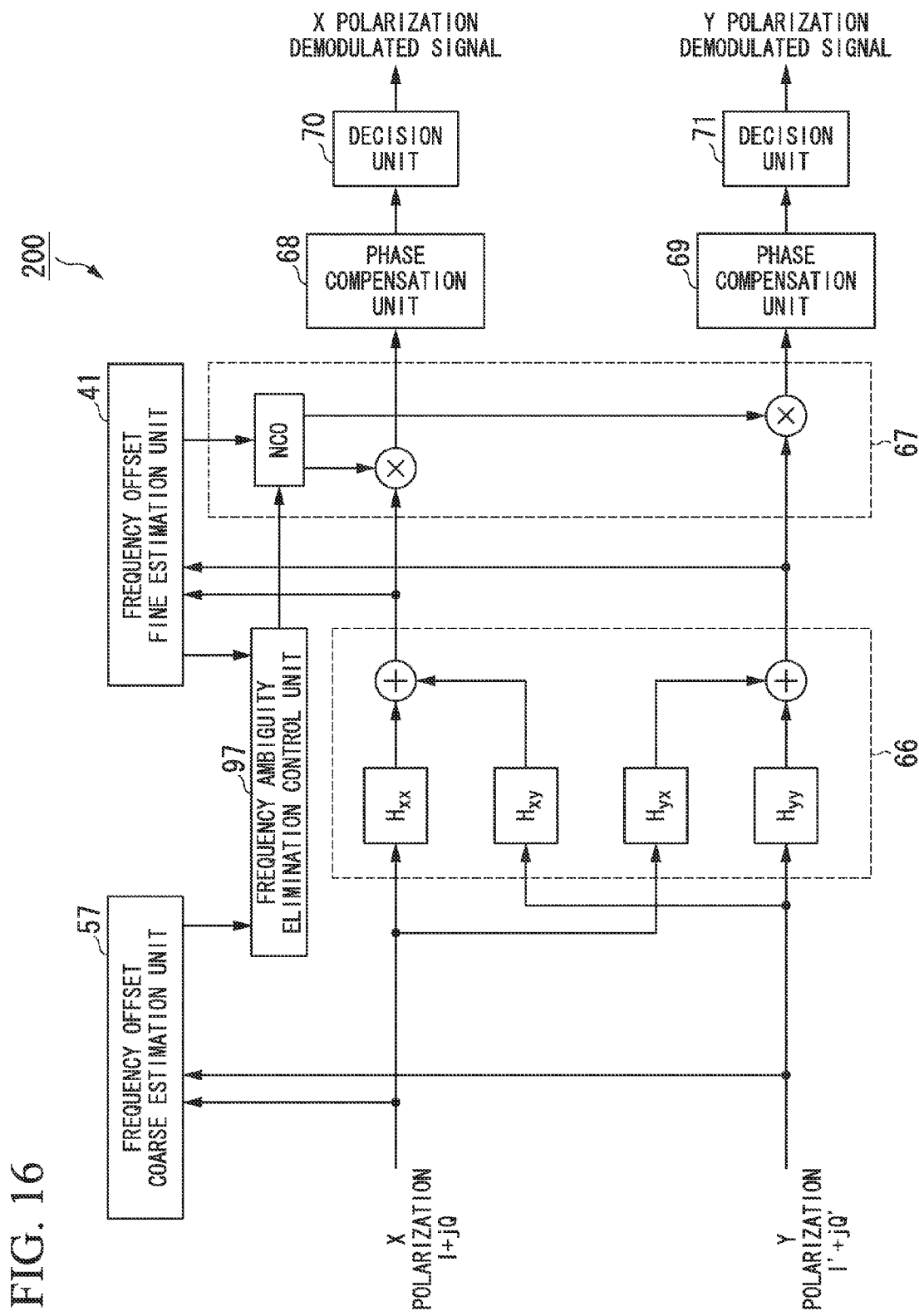
FIG. 16 is a block diagram illustrating a configuration example of a reception apparatus in accordance with an eighth embodiment.

FIG. 16 is a block diagram illustrating a configuration example of a reception apparatus 200 in accordance with the eighth embodiment of the present invention. It is to be noted that, in FIG. 16, since the same reference symbols are used to designate the configuration corresponding to each unit of FIG. 12, a description thereof will be omitted.

The polarization demultiplexing unit 66 performs polarization demultiplexing and residual dispersion elimination on an input signal I+jQ and an input signal I'+jQ'. The frequency offset fine estimation unit 41 receives signals output from the polarization demultiplexing unit 66, and estimates a frequency offset.

The frequency ambiguity elimination control unit 97 receives an estimated value of the frequency offset coarse estimation unit 57 and an estimated value of the frequency offset fine estimation unit 41, and determines an estimated frequency offset in accordance with Formula 12 to Formula 16. Then, the frequency offset compensation unit 67 receives the determined estimated frequency offset output from the frequency ambiguity elimination control unit 97, and compensates for the frequency offset of the input signals.

Next, the first phase compensation unit 68 and the second phase compensation unit 69 compensate for the phases of signals with the frequency offset compensated for by the frequency offset compensation unit 67, and output to the first decision unit 70 and the second decision unit 71, respectively. The first decision unit 70 and the second decision unit 71 perform symbol decision to generate demodulated signals.

As described above, the reception apparatus 200 of the eighth embodiment also performs the polarization demultiplexing and the residual dispersion elimination together with the frequency offset estimation by the frequency offset estimation apparatus 150, thereby making it possible to operate the frequency offset fine estimation unit 41 with respect to an input signal with a small frequency offset and a small dispersion value. Consequently, it is possible for the reception apparatus 200 of the eighth embodiment to estimate and compensate for a frequency offset of a received signal with high accuracy in a wideband, and to perform demodulation.

It is to be noted that the signals input to the frequency offset fine estimation unit 41 may be the signals before being input to the polarization demultiplexing unit 66, instead of the output signals of the polarization demultiplexing unit 66. However, when the signals subjected to the polarization demultiplexing and the residual dispersion elimination in the polarization demultiplexing unit 66 are input to the frequency offset fine estimation unit 41, it is possible to estimate a frequency offset with higher accuracy.

Furthermore, a program for realizing the functions of respective units constituting the frequency offset estimation apparatuses in FIG. 1, FIG. 6, FIG. 7, FIG. 9, FIG. 11, FIG. 12, FIG. 13, and FIG. 16 may be recorded on a computer-readable recording medium, and the program recorded on the recording medium may be read and executed by a computer system, so that the processes by each configuration may be performed. It is to be noted that it is assumed that the "computer system" described herein includes an operating system (OS) and hardware such as a peripheral device.

Furthermore, it is assumed that the "computer system" includes a homepage-providing environment (or a display environment) if a World Wide Web (WWW) system is used.

Furthermore, the "computer readable recording medium" denotes a portable medium such as a flexible disk, a magneto-optical disc, a read only memory (ROM), or a compact disc (CD)-ROM, and a storage device such as a hard disk embedded in the computer system. Moreover, the "computer readable recording medium" may include a medium that dynamically holds a program for a short time, such as a communications line when the program is transmitted through a network such as the Internet or a communications line such as a telephone line, or a medium that holds the program for a constant time such as a volatile memory in a computer system serving as a server or a client in that case. Furthermore, the program may be a program for realizing a part of the aforementioned functions, and may further be a program capable of realizing the aforementioned functions through a combination with a program already recorded on the computer system.

So far, embodiments of the present invention have been described in detail with reference to the drawings; however, specific configurations are not limited to the aforementioned embodiments, and, for example, designs without departing from the gist of the present invention are included.

For example, in a reception apparatus or a frequency offset estimation apparatus provided with a frequency ambiguity elimination control unit, a configuration for realizing fine estimation of a frequency offset is not limited to a configuration of the phase increment frequency offset estimation apparatus (unit) 20 (FIG. 7) or the frequency offset fine estimation unit 41 (FIG. 13 and FIG. 16). Instead, it may be possible to use a conventional general configuration having a periodical frequency offset estimation characteristic such as a sawtooth wave illustrated in FIG. 5 or FIG. 14.

INDUSTRIAL APPLICABILITY

The present invention is applicable to, for example, a digital coherent optical receiver and a wireless communications receiver. In accordance with the present invention, it is possible to estimate a frequency offset of a received signal with high accuracy at a high speed in a wideband.

DESCRIPTION OF REFERENCE SYMBOLS

1 FFT unit
3 band-pass filter
12 frequency offset estimation control unit
15, 150 frequency offset estimation apparatus
20, 67 phase increment frequency offset estimation apparatus
24, 25, 68, 69 phase compensation unit
26, 27, 70, 71 decision unit
28, 29 frequency offset compensation unit
30, 97 frequency ambiguity elimination control unit
41 frequency offset fine estimation unit
41a first operation unit
41b second operation unit
41c third operation unit
41d fourth operation unit
57 frequency offset coarse estimation unit
58 sweep frequency range control unit
200 reception apparatus

The invention claimed is:

1. A frequency offset estimation apparatus which estimates a frequency offset which is the difference between a carrier frequency of a received signal and the frequency of an output signal of a local oscillator, the apparatus comprising:
a frequency domain conversion unit that converts the received signal sampled in advance with a predetermined sampling frequency into a frequency domain, and outputs a frequency spectrum having N frequency components to which numbers from 1 to N (N is an arbitrary natural number) have been sequentially assigned in order of the size of a frequency;
a frequency band limitation unit that limits a frequency band of negative frequency components which have frequency component numbers of 1 to N/2 of the frequency spectrum and a frequency band of positive frequency components which have frequency component numbers of N/2+1 to N of the frequency spectrum; and
a frequency offset estimation control unit that calculates the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifts all frequency components of the frequency spectrum in a frequency domain until the absolute value of a power difference calculated from the power of the positive frequency components and the power of the negative frequency components is less than or equal to a predetermined threshold value, and estimates the frequency offset based on a shift amount until the absolute value is less than or equal to the threshold value.

2. The frequency offset estimation apparatus according to claim 1, wherein, when all the frequency components of the frequency spectrum are cyclically shifted in the frequency domain,
if the power of the positive frequency components is larger than the power of the negative frequency components, the frequency offset estimation control unit shifts all the frequency components of the frequency spectrum in a negative direction by a predetermined size and adds N to a frequency component number after shift if the frequency component number after the shift is less than 1, and
if the power of the positive frequency components is less than or equal to the power of the negative frequency components, the frequency offset estimation control unit shifts all the frequency components of the frequency spectrum in a positive direction by a predetermined size and subtracts N from a frequency component number after shift if the frequency component number after the shift exceeds N.

3. A reception apparatus comprising:
the frequency offset estimation apparatus according to claim 1;
a first frequency offset compensation unit that compensates for the frequency offset of the received signal based on the value of the frequency offset of the received signal estimated by the frequency offset estimation apparatus;
a phase increment frequency offset estimation unit that estimates a frequency offset of the received signal which has been compensated by the first frequency offset compensation unit, based on a phase increment algorithm; and
a second frequency offset compensation unit that compensates for the frequency offset based on the value of the frequency offset of the received signal estimated by the phase increment frequency offset estimation unit.

4. A frequency offset estimation method which is used in a frequency offset estimation apparatus estimating a frequency offset which is the difference between a carrier frequency of a received signal and the frequency of an output signal of a local oscillator, the method comprising:

a frequency domain conversion step of converting the received signal sampled in advance with a predetermined sampling frequency into a frequency domain, and outputting a frequency spectrum having N frequency components to which numbers from 1 to N (N is an arbitrary natural number) have been sequentially assigned in order of the size of a frequency;

a frequency band limitation step of limiting a frequency band of negative frequency components which have frequency component numbers of 1 to N/2 of the frequency spectrum and a frequency band of positive frequency components which have frequency component numbers of N/2+1 to N of the frequency spectrum; and a frequency offset estimation control step of calculating the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifting all frequency components of the frequency spectrum in a frequency domain until the absolute value of a power difference calculated from the power of the positive frequency components and the power of the negative frequency components is less than or equal to a predetermined threshold value, and estimating the frequency offset based on a shift amount until the absolute value is less than or equal to the threshold value.

5. The frequency offset estimation method according to claim 4, wherein, in the frequency offset estimation control step, when all the frequency components of the frequency spectrum are cyclically shifted in the frequency domain, if the power of the positive frequency components is larger than the power of the negative frequency components, all the frequency components of the frequency spectrum are shifted in a negative direction by a predetermined size and N is added to a frequency component number after shift if the frequency component number after the shift is less than 1, and if the power of the positive frequency components is less than or equal to the power of the negative frequency components, all the frequency components of the frequency spectrum are shifted in a positive direction by a predetermined size and N is subtracted from a frequency component number after shift if the frequency component number after the shift exceeds N, so that the frequency spectrum is cyclically shifted.

6. A reception method comprising:

the steps of the frequency offset estimation method according to claim 4;

a first frequency offset compensation step of compensating for the frequency offset of the received signal based on the value of the frequency offset of the received signal estimated in the steps of the frequency offset estimation method;

a phase increment frequency offset estimation step of estimating a frequency offset of the received signal which has been compensated in the first frequency offset compensation step, based on a phase increment algorithm; and a second frequency offset compensation step of compensating for the frequency offset based on the value of the frequency offset of the received signal estimated in the phase increment frequency offset estimation step.

7. A frequency offset estimation apparatus which estimates the difference between a carrier frequency of a received signal and the frequency of an output signal of a local oscillator, the apparatus comprising:

a frequency offset coarse estimation unit that estimates a frequency offset from a frequency spectrum of the received signal including two polarizations sampled in advance with a predetermined sampling frequency;

a sweep frequency range control unit that determines a range of a sweep frequency based on a coarsely estimated value of the frequency offset coarse estimation unit; and a frequency offset fine estimation unit that estimates a frequency offset of the received signal based on the range of the sweep frequency determined by the sweep frequency range control unit, wherein the frequency offset fine estimation unit comprises:

a first operation unit that raises the two polarizations in the received signal to a $W^{th}$ power and converts the frequency of the received signal by subtracting the sweep frequency from the frequency of the received signal when rotational symmetry of constellation points on a constellation with no frequency offset of the received signal is defined as $2\pi/W$ (W: a positive integer);

a second operation unit that averages or adds operation results of N (N: a positive integer) symbols of each polarization in the first operation unit, and calculates an absolute value or a power of the absolute value;

a third operation unit that is provided as a next-stage of the second operation unit, adds operation results of the two polarizations or selects an operation result of polarization with a larger peak value, and adds or averages U (U: a positive integer) frames each including the N symbols; and a fourth operation unit that detects a sweep frequency at which an operation result of the third operation unit has a maximum value, and multiplies the sweep frequency by 1/W to estimate the frequency offset.

8. A reception apparatus comprising:

the frequency offset estimation apparatus according to claim 7;

a frequency offset compensation unit that compensates for the frequency offset of the received signal based on the value of the frequency offset of the received signal estimated by the frequency offset estimation apparatus;

a phase compensation unit that compensates for the phase of the received signal compensated by the frequency offset compensation unit; and a decision unit that performs symbol decision on the received signal with the compensated phase.

9. A frequency offset estimation method which estimates the difference between a carrier frequency of a received signal and the frequency of an output signal of a local oscillator, the method comprising:

a frequency offset coarse estimation step of estimating a frequency offset from a frequency spectrum of the received signal including two polarizations sampled in advance with a predetermined sampling frequency;

a sweep frequency range control step of determining a range of a sweep frequency based on a coarsely estimated value estimated in the frequency offset coarse estimation step; and a frequency offset fine estimation step of estimating a frequency offset of the received signal based on the range of the sweep frequency determined in the sweep frequency range control step, wherein the frequency offset fine estimation step comprises:

a first operation step of raising the two polarizations in the received signal to a $W^{th}$ power and converting the frequency of the received signal by subtracting the sweep frequency from the frequency of the received signal when rotational symmetry of constellation points on a constellation with no frequency offset of the received signal is defined as $2\pi/W$ (W: a positive integer);

a second operation step of adding or averaging operation results of N (N: a positive integer) symbols of each polarization in the first operation step, and calculating an absolute value or a power of the absolute value;

a third operation step of adding operation results of the two polarizations or selecting an operation result of polarization with a larger peak value, and adding or averaging U (U: a positive integer) frames each including the N symbols, after the second operation step; and a fourth operation step of detecting a sweep frequency at which an operation result of the third operation step has a maximum value, and multiplying the sweep frequency by 1/W to estimate the frequency offset.

10. A reception method comprising:

the steps of the frequency offset estimation method according to claim 9;

a frequency offset compensation step of compensating for the frequency offset of the received signal based on the value of the frequency offset of the received signal estimated in the steps of the frequency offset estimation method;

a phase compensation step of compensating for the phase of the received signal compensated in the frequency offset compensation step; and a decision step of performing symbol decision on the received signal with the compensated phase.

11. A frequency offset estimation apparatus which estimates the difference between a carrier frequency of a received signal and the frequency of an output signal of a local oscillator, the apparatus comprising:

a frequency offset coarse estimation unit that estimates a frequency offset from a frequency spectrum of the received signal including two polarizations sampled in advance with a predetermined sampling frequency;

a frequency offset fine estimation unit that has a periodical frequency offset estimation characteristic with respect to the received signal or a signal obtained by compensating for dispersion of the received signal; and a frequency ambiguity elimination control unit that eliminates frequency ambiguity of a frequency offset which has been estimated by the frequency offset fine estimation unit, based on the value of the frequency offset estimated by the frequency offset coarse estimation unit, to estimate the frequency offset.

12. The frequency offset estimation apparatus according to claim 11, wherein the frequency offset fine estimation unit estimates the frequency offset of the received signal or the signal obtained by compensating for the dispersion of the received signal, based on a phase increment algorithm.

13. The frequency offset estimation apparatus according to claim 11, wherein, when rotational symmetry of constellation points on a constellation with no frequency offset of the received signal is defined as $2\pi/W$ (W: a positive integer), the frequency offset fine estimation unit raises the two polarizations in the received signal to $W^{th}$ powers, performs conversion into frequency spectrums, calculates the absolute values of the results of the conversion or powers of the absolute values, adds the frequency spectrums of the two polarizations or selects a frequency spectrum of polarization with a larger peak value, adds or averages frequency spectrums of U (U: a positive integer) frames each including N (N: a positive integer) symbols, and detects a frequency at which the result of the operation has a maximum value.

14. The frequency offset estimation apparatus according to claim 11, wherein, when eliminating the frequency ambiguity and estimating the frequency offset, the frequency ambiguity elimination control unit calculates frequencies serving as frequency offset candidates including the frequency ambiguity based on the frequency offset estimated by the frequency offset fine estimation unit, sets the center of frequencies of frequency offset candidates that are adjacent in a frequency domain as a boundary between the adjacent frequency offset candidates, selects an area including the value estimated by the frequency offset coarse estimation unit from areas based on boundaries in the frequency domain, and selects a frequency serving as a frequency offset candidate included in the selected area as an estimated value of the frequency offset.

15. The frequency offset estimation apparatus according to claim 11, wherein the frequency offset coarse estimation unit comprises:

a frequency domain conversion unit that converts the received signal into a frequency domain, and outputs a frequency spectrum having N frequency components to which numbers from 1 to N (N is an arbitrary natural number) have been sequentially assigned in order of the size of a frequency;

a frequency band limitation unit that limits a frequency band of negative frequency components which have frequency component numbers of 1 to N/2 of the frequency spectrum and a frequency band of positive frequency components which have frequency component numbers of N/2+1 to N of the frequency spectrum; and a frequency offset estimation control unit that calculates the sum of the squares of the positive frequency components of the frequency spectrum that have been subjected to frequency band limitation and the sum of the squares of the negative frequency component of the frequency spectrum that have been subjected to frequency band limitation to calculate power of the positive frequency components and power of the negative frequency components, and cyclically shifts all frequency components of the frequency spectrum in a frequency domain until the absolute value of a power difference calculated from the power of the positive frequency components and the power of the negative frequency components is less than or equal to a predetermined threshold value, and estimates the frequency offset based on a shift amount until the absolute value is less than or equal to the threshold value.

16. A reception apparatus comprising:

the frequency offset estimation apparatus according to claim 11;

a frequency offset compensation unit that compensates for the frequency offset of the received signal based on the value of the frequency offset of the received signal estimated by the frequency offset estimation apparatus;

a phase compensation unit that compensates for the phase of the received signal compensated by the frequency offset compensation unit; and a decision unit that performs symbol decision on the received signal with the compensated phase.

17. A frequency offset estimation method which estimates the difference between a carrier frequency of a received signal and the frequency of an output signal of a local oscillator, the method comprising:
- a frequency offset coarse estimation step of estimating a frequency offset from a frequency spectrum of the received signal including two polarizations sampled in advance with a predetermined sampling frequency;
- a frequency offset fine estimation step of providing a periodical frequency offset estimation characteristic with respect to the received signal or a signal obtained by compensating for dispersion of the received signal; and
- a frequency ambiguity elimination control step of eliminating frequency ambiguity of a frequency offset which has been estimated in the frequency offset fine estimation step, based on the value of the frequency offset estimated in the frequency offset coarse estimation step, and estimating the frequency offset.

18. The frequency offset estimation method according to claim 17, wherein, in the frequency offset fine estimation step, the frequency offset of the received signal or the signal obtained by compensating for the dispersion of the received signal is estimated based on a phase increment algorithm.

19. The frequency offset estimation method according to claim 17, wherein, in the frequency offset fine estimation step, when rotational symmetry of constellation points on a constellation with no frequency offset of the received signal is defined as $2\pi/W$ (W: a positive integer), the two polarizations in the received signal are raised to $W^{th}$ powers and are converted into frequency spectrums, the absolute values of the result of the conversion or powers of the absolute values are calculated, the frequency spectrums of the two polarizations are added or a frequency spectrum of polarization with a larger peak value is selected, frequency spectrums of U (U: a positive integer) frames each including N (N: a positive integer) symbols are added or averaged, and a frequency at which the result of the operation has a maximum value is detected.

20. The frequency offset estimation method according to claim 17, wherein, in the frequency ambiguity elimination control step, when eliminating the frequency ambiguity and estimating the frequency offset, frequencies serving as frequency offset candidates including the frequency ambiguity are calculated based on the frequency offset estimated in the frequency offset fine estimation step, the center of frequencies of frequency offset candidates that are adjacent in a frequency domain is set as a boundary between the adjacent frequency offset candidates, an area including the value estimated in the frequency offset coarse estimation step is selected from areas based on boundaries in the frequency domain, and a frequency serving as a frequency offset candidate included in the selected area is selected as an estimated value of the frequency offset.

21. The frequency offset estimation method according to claim 17, wherein the frequency offset coarse estimation step comprises:
- a frequency domain conversion step of converting the received signal into a frequency domain, and outputting a frequency spectrum having N frequency components to which numbers from 1 to N (N is an arbitrary natural number) have been sequentially assigned in order of the size of a frequency;
- a frequency band limitation step of limiting a frequency band of negative frequency components which have frequency component numbers of 1 to N/2 of the frequency spectrum and a frequency band of positive frequency components which have frequency component numbers of N/2+1 to N of the frequency spectrum; and
- a frequency offset estimation control step of calculating the sum of the squares of the positive frequency components of the frequency spectrum that have been subjected to frequency band limitation and the sum of the squares of the negative frequency components of the frequency spectrum that have been subjected to frequency band limitation to calculate power of the positive frequency components and power of the negative frequency components, and cyclically shifting all frequency components of the frequency spectrum in a frequency domain until the absolute value of a power difference calculated from the power of the positive frequency components and the power of the negative frequency components is less than or equal to a predetermined threshold value, and estimating the frequency offset based on a shift amount until the absolute value is less than or equal to the threshold value.

22. A reception method comprising:
the steps of the frequency offset estimation method according to claim 17;
- a frequency offset compensation step of compensating for the frequency offset of the received signal based on the value of the frequency offset of the received signal estimated in the steps of the frequency offset estimation method;
- a phase compensation step of compensating for the phase of the received signal compensated in the frequency offset compensation step; and
- a decision step of performing symbol decision on the received signal with the compensated phase.

* * * * *